US012685932B2

(12) United States Patent
Abe

(10) Patent No.: US 12,685,932 B2
(45) Date of Patent: Jul. 21, 2026

(54) SYSTEMS AND METHODS OF ADAPTING THE APPEARANCE FREQUENCY OF A GAME TYPE WITH MOTION CONTROLLED GAMES

(71) Applicant: Nintendo Co., Ltd., Kyoto (JP)

(72) Inventor: Goro Abe, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 257 days.

(21) Appl. No.: 18/399,126

(22) Filed: Dec. 28, 2023

(65) Prior Publication Data

US 2025/0032912 A1      Jan. 30, 2025

(30) Foreign Application Priority Data

Jul. 26, 2023    (JP) ................................. 2023-121660

(51) Int. Cl.
*A63F 13/00*        (2014.01)
*A63F 13/211*       (2014.01)
*A63F 13/47*        (2014.01)
*A63F 13/67*        (2014.01)

(52) U.S. Cl.
CPC ............. *A63F 13/47* (2014.09); *A63F 13/211* (2014.09); *A63F 13/67* (2014.09)

(58) Field of Classification Search
CPC ........ A63F 13/47; A63F 13/67; A63F 13/212; A63F 13/428; A63F 13/44; A63F 13/211
See application file for complete search history.

(56) References Cited

U.S. PATENT DOCUMENTS

| | | | | | |
|---|---|---|---|---|---|
| 11,458,385 | B2 * | 10/2022 | Kasuno | ................. | A63F 13/211 |
| 2010/0113153 | A1 * | 5/2010 | Yen | ........................ | A63F 13/212 |
| | | | | | 463/37 |
| 2011/0263328 | A1 * | 10/2011 | Yamashita | .............. | A63F 13/24 |
| | | | | | 463/36 |
| 2012/0122576 | A1 * | 5/2012 | Mao | ....................... | A63F 13/245 |
| | | | | | 463/32 |
| 2013/0005467 | A1 * | 1/2013 | Kim | ........................ | A63F 13/73 |
| | | | | | 463/36 |

(Continued)

FOREIGN PATENT DOCUMENTS

| | | |
|---|---|---|
| JP | 2018-108296 | 7/2018 |
| JP | 2022-081163 | 5/2022 |

OTHER PUBLICATIONS

"Any way to avoid this screen when Wii games are loaded?",Feb. 25, 2019, Reddit, <https://www.reddit.com/r/WiiHacks/comments/aulm3u/any_way_to_avoid_this_screen_when_wii_games_are/ )(hereinafter referred to as Wii_remote> (Year: 2019).*

(Continued)

*Primary Examiner* — Justin L Myhr
(74) *Attorney, Agent, or Firm* — Nixon & Vanderhye, PC

(57) ABSTRACT

A game program causes a computer to continuously execute a plurality of types of games. The game program causes the computer to: sequentially determine appearing games that appear during continuous execution of a plurality of games, among a plurality of types of games; and continuously execute the appearing games having been determined. The appearing games are determined such that, if a second-type game does not appear after a first-type game has appeared, frequency of appearance of the first-type game is reduced.

28 Claims, 20 Drawing Sheets

(56)                    References Cited

U.S. PATENT DOCUMENTS

| | | | |
|---|---|---|---|
| 2014/0080600 A1* | 3/2014 | Knutsson .............. | A63F 13/428 |
| | | | 463/31 |
| 2018/0185751 A1 | 7/2018 | Kojima et al. | |
| 2018/0361234 A1* | 12/2018 | Nietfeld .................. | A63F 13/42 |
| 2019/0070502 A1* | 3/2019 | Hirose .................... | A63F 13/45 |
| 2022/0152503 A1 | 5/2022 | Abe | |

OTHER PUBLICATIONS

WarioWare,2003,ninentendo.fandom.com,<https://nintendo.fandom.com/wiki/WarioWare_(series)> (Year: 2003).*
"Wario Ware: Smooth Moves", Nintendo Co., Ltd., [online], searched on Jul. 11, 2023, 4 pages, internet URL: https://www.nintendo.co.jp/wii/rodj/soft_info/index.html (with machine translation).
Nov. 4, 2025 Office Action issued in Japanese Patent Application No. 2023-121660, pp. 1-8 [English translation included].

* cited by examiner

F I G.  1
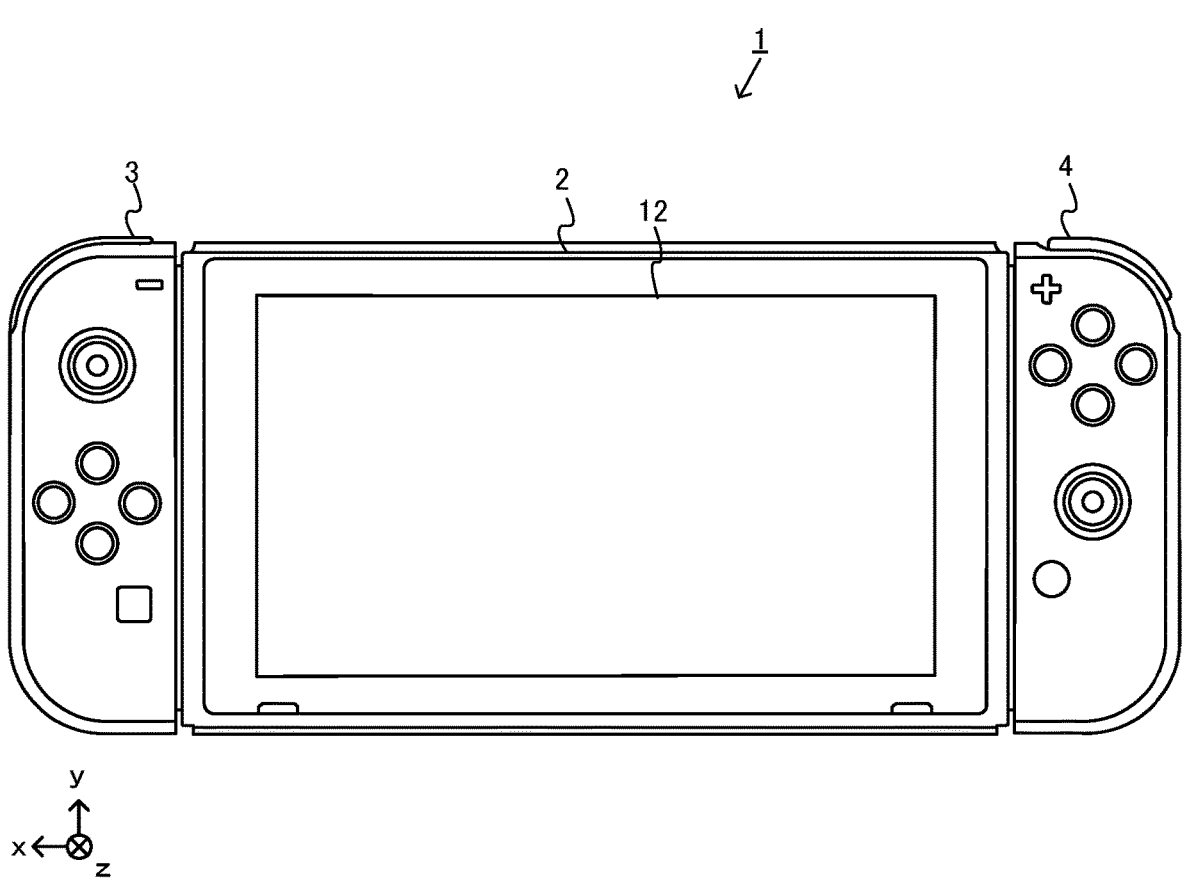

F I G.  2
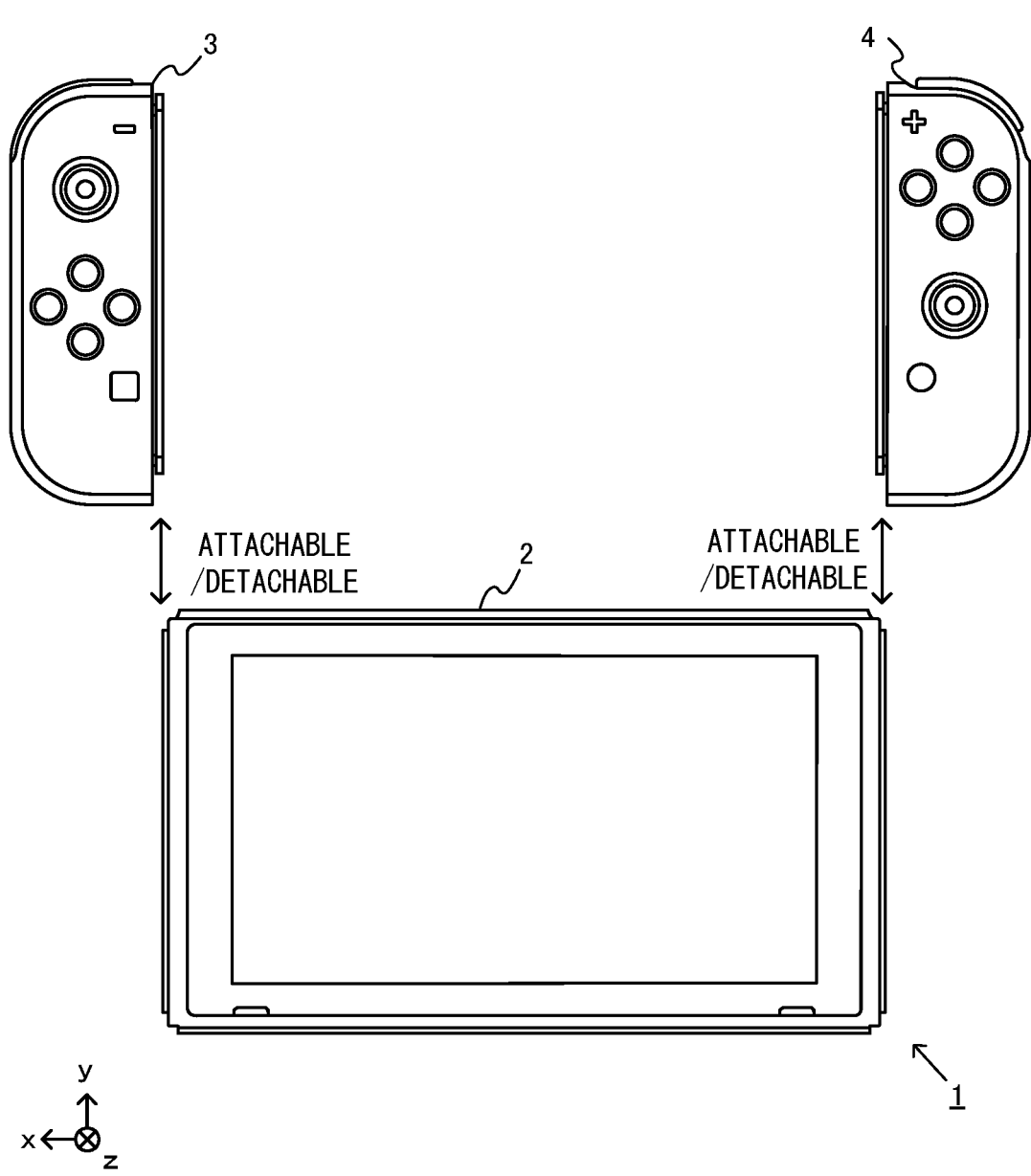

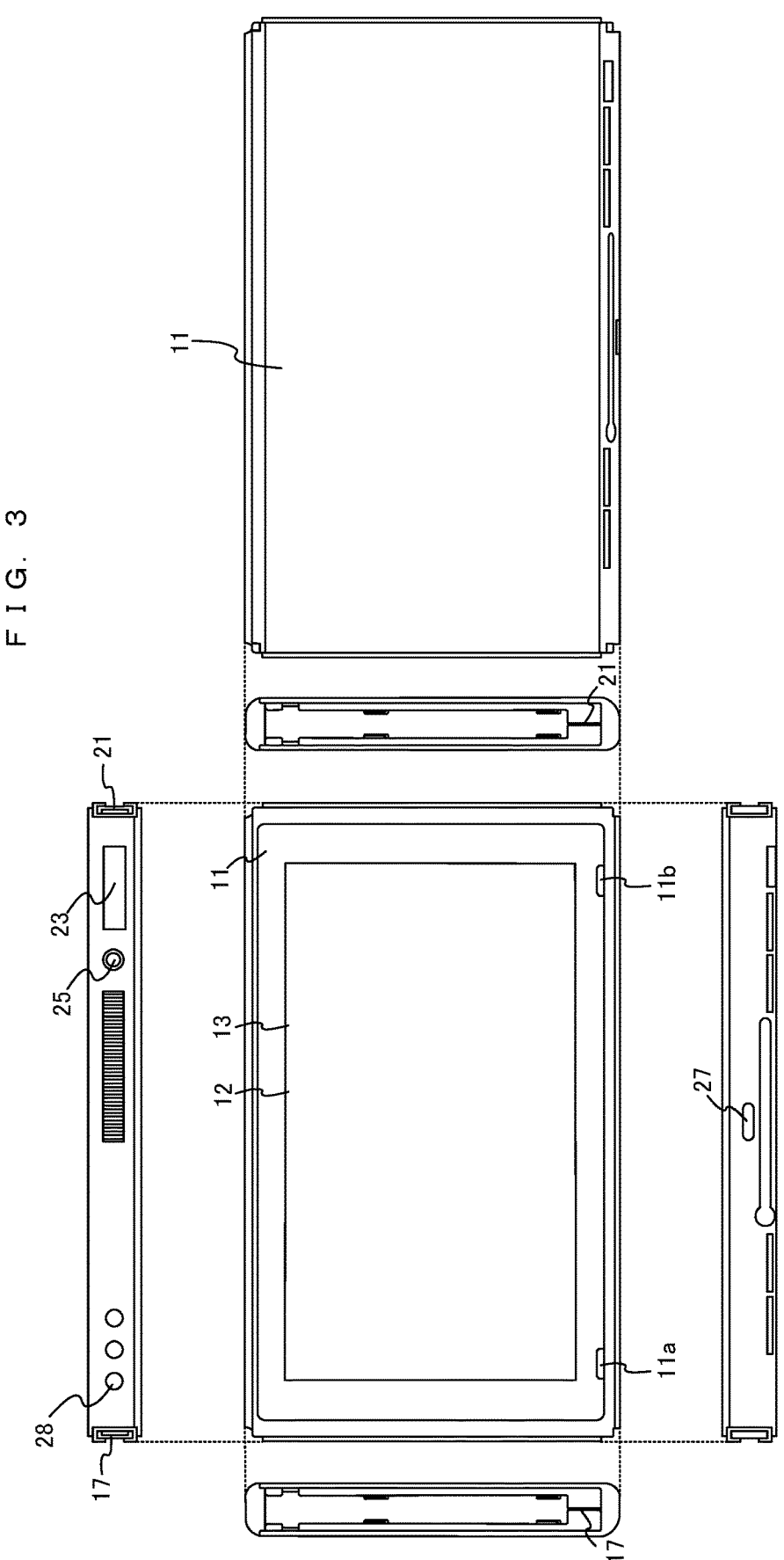
F I G. 3

F I G. 4
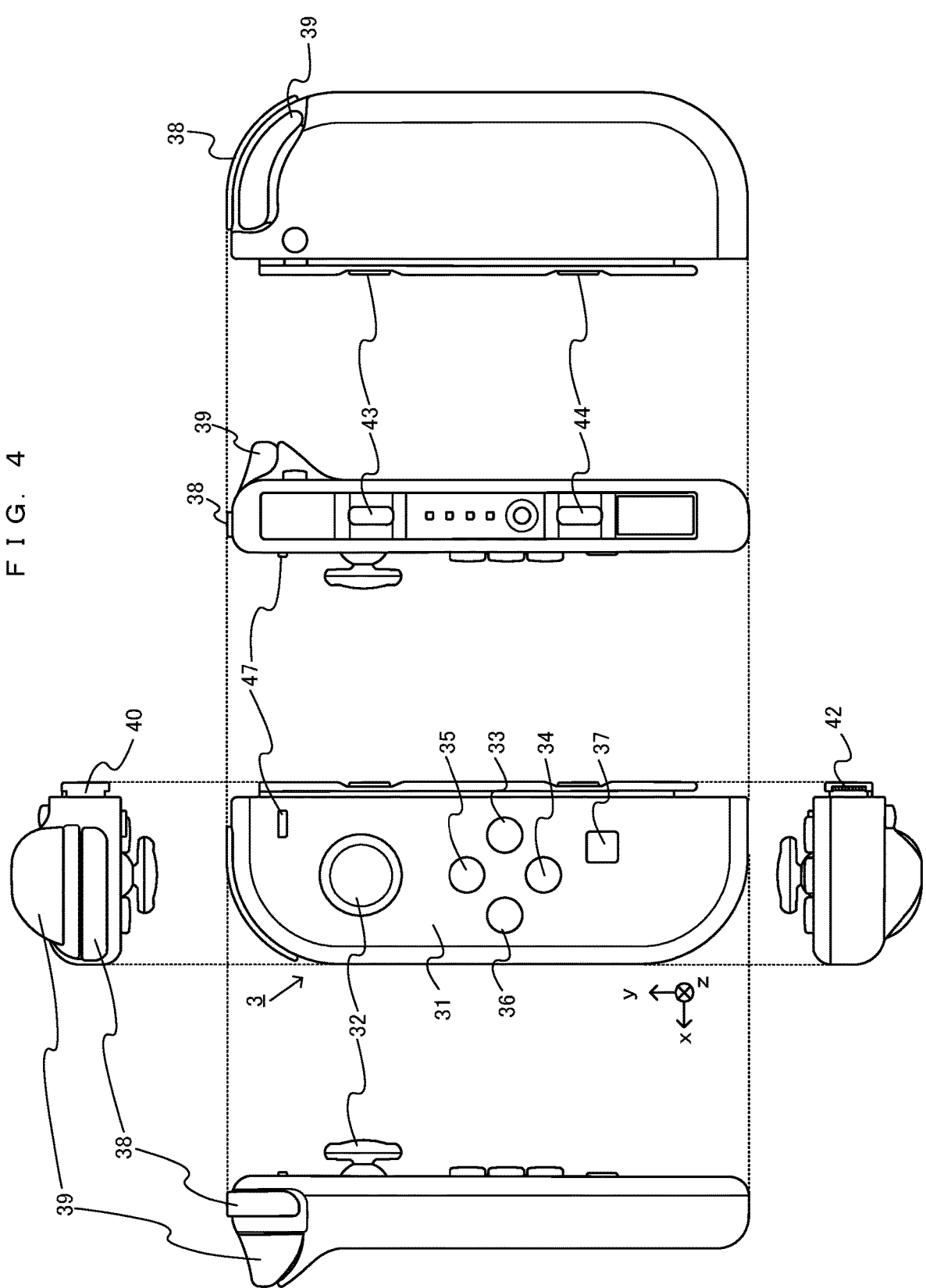

F I G .  5
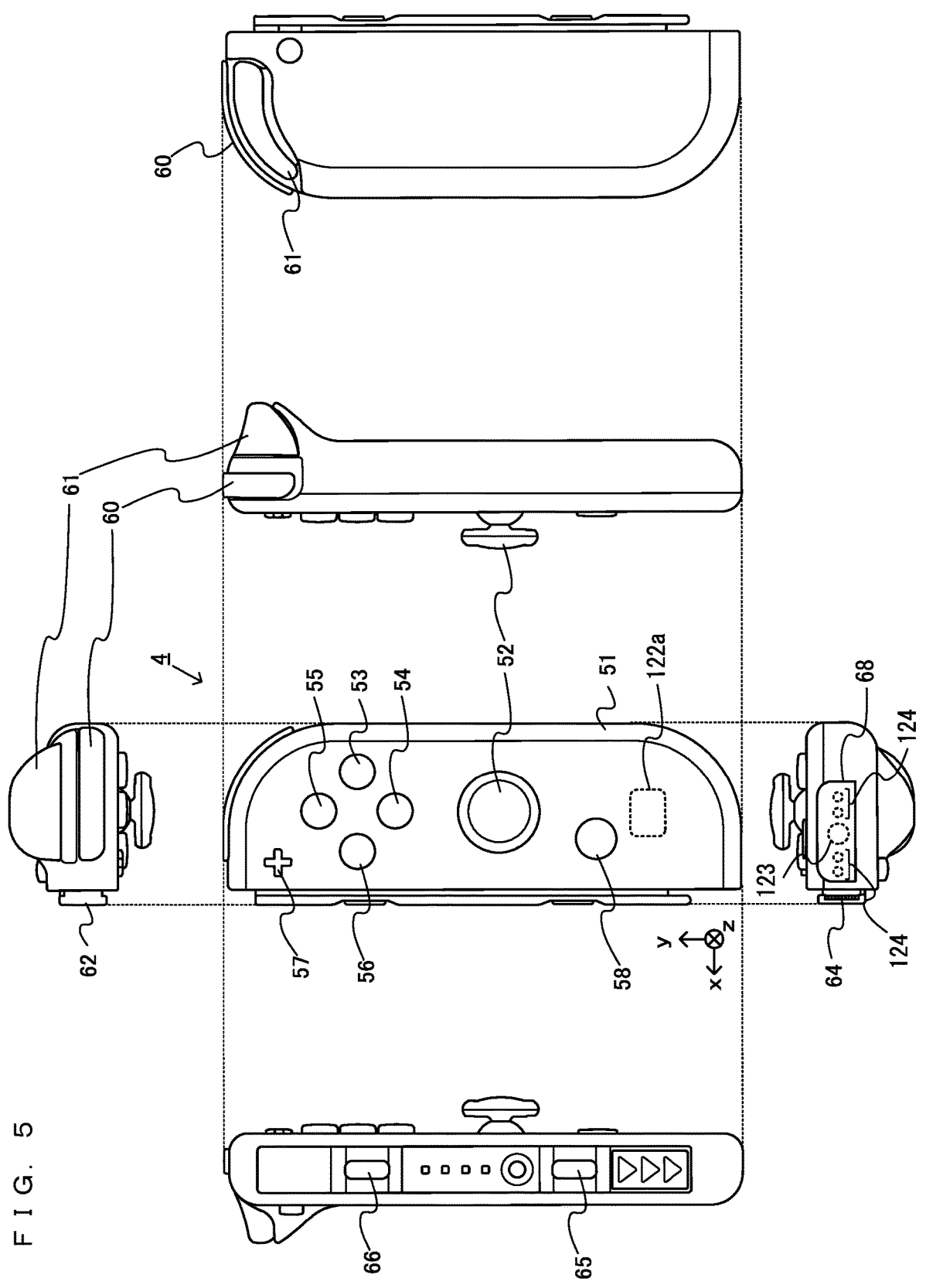

FIG. 7

F I G.  8
150
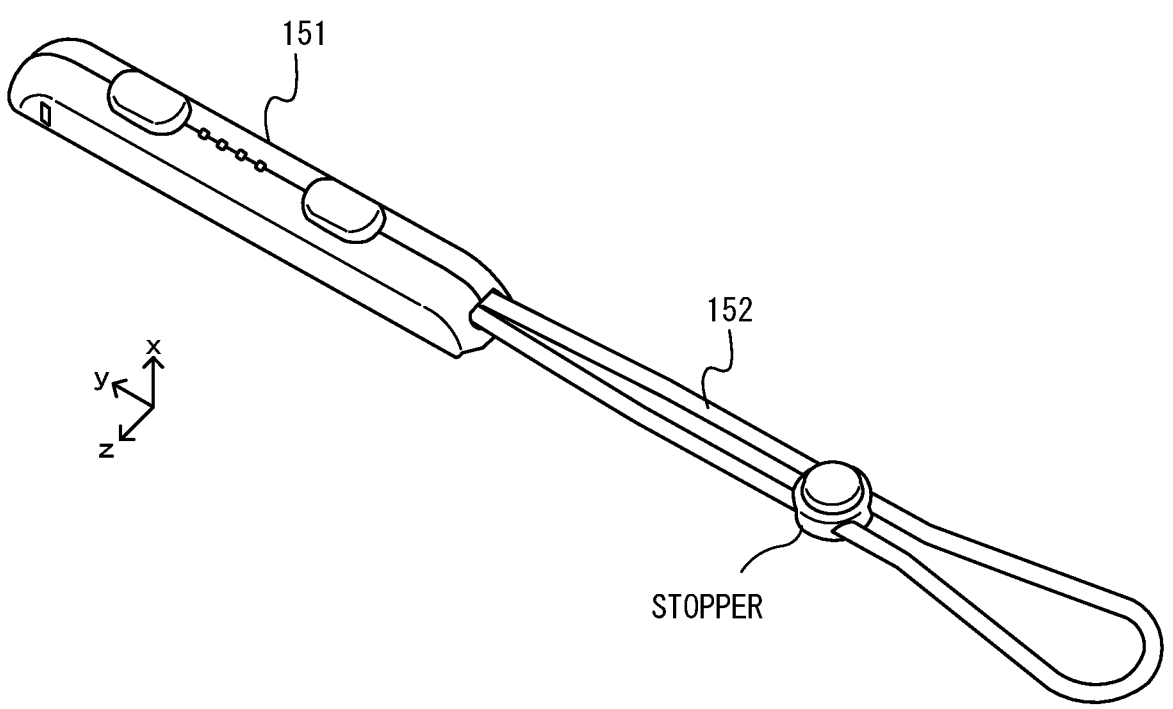
151
152
STOPPER

F I G.  9
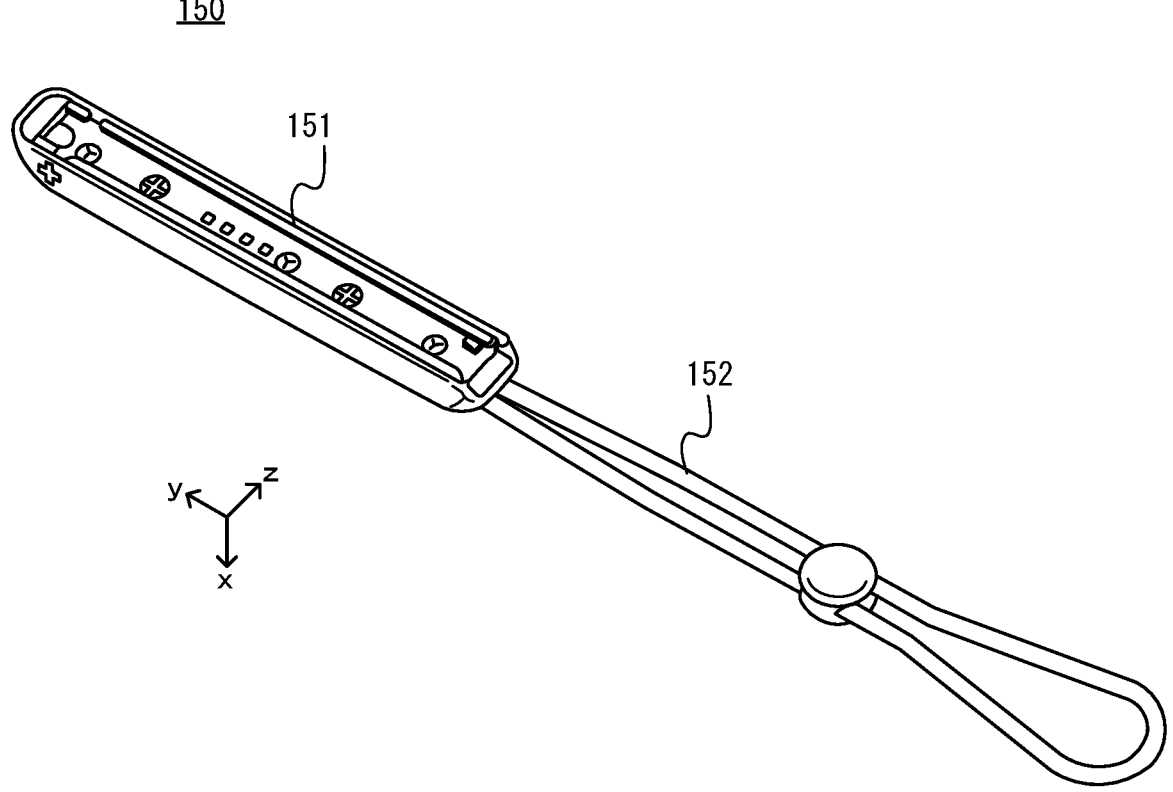

F I G . 1 0
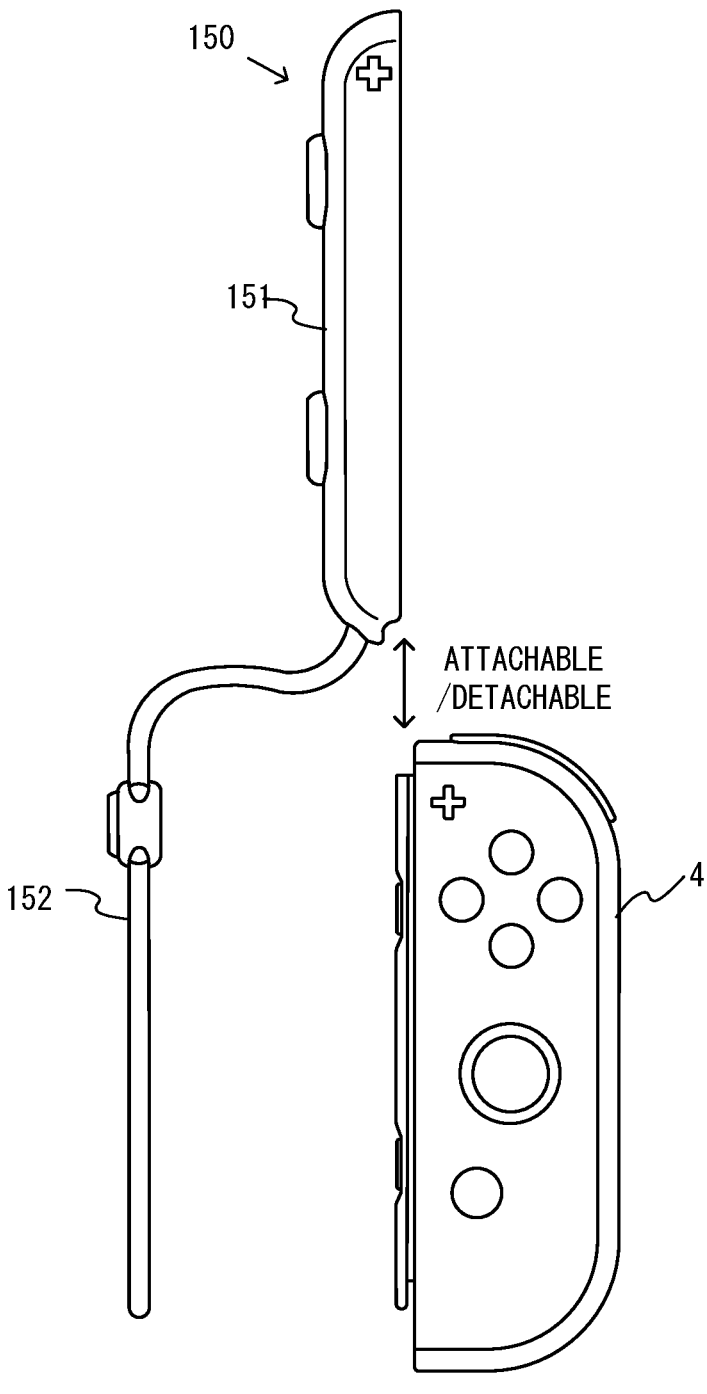
150
151
152
ATTACHABLE
/DETACHABLE
4

F I G . 1 1
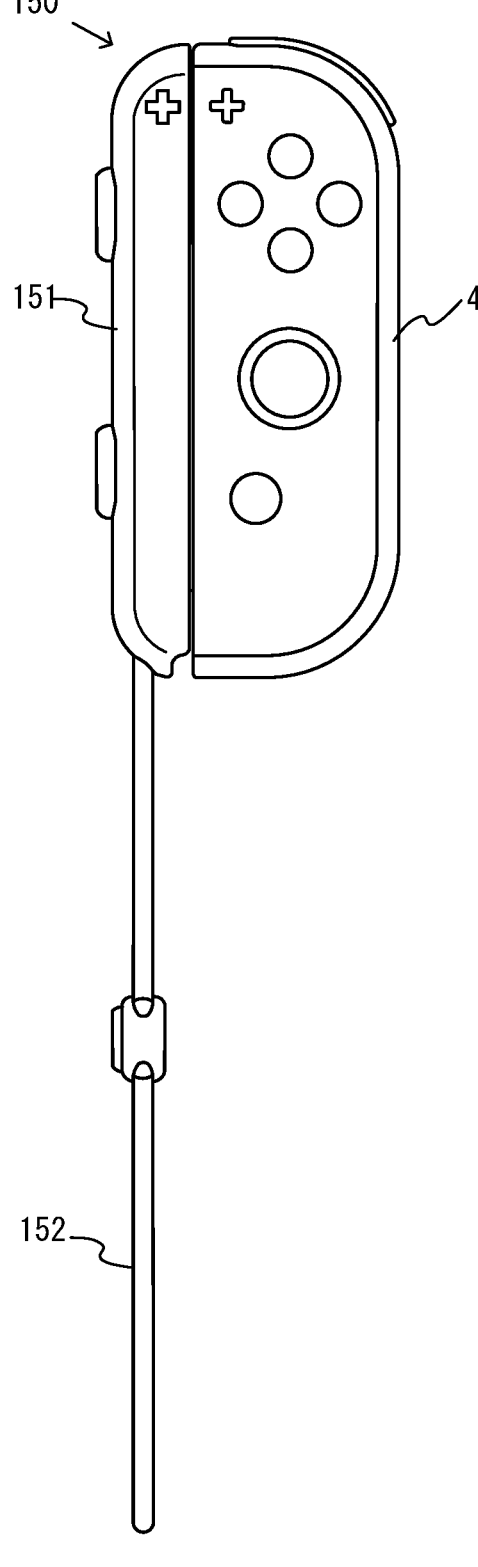

F I G.  1 2
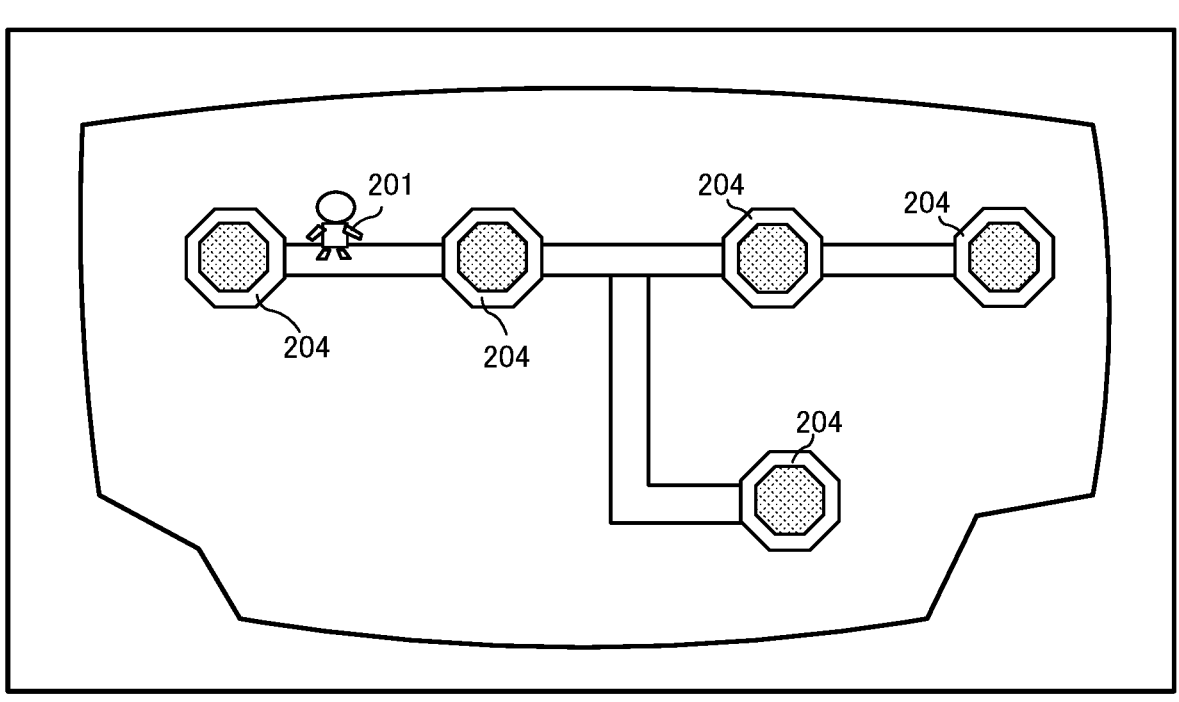

F I G.  1 4
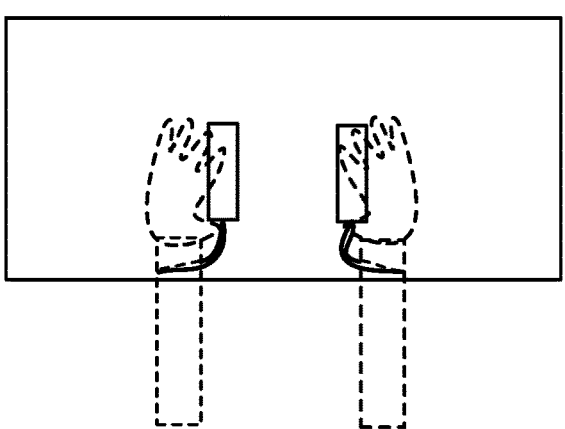
F I G.  1 5
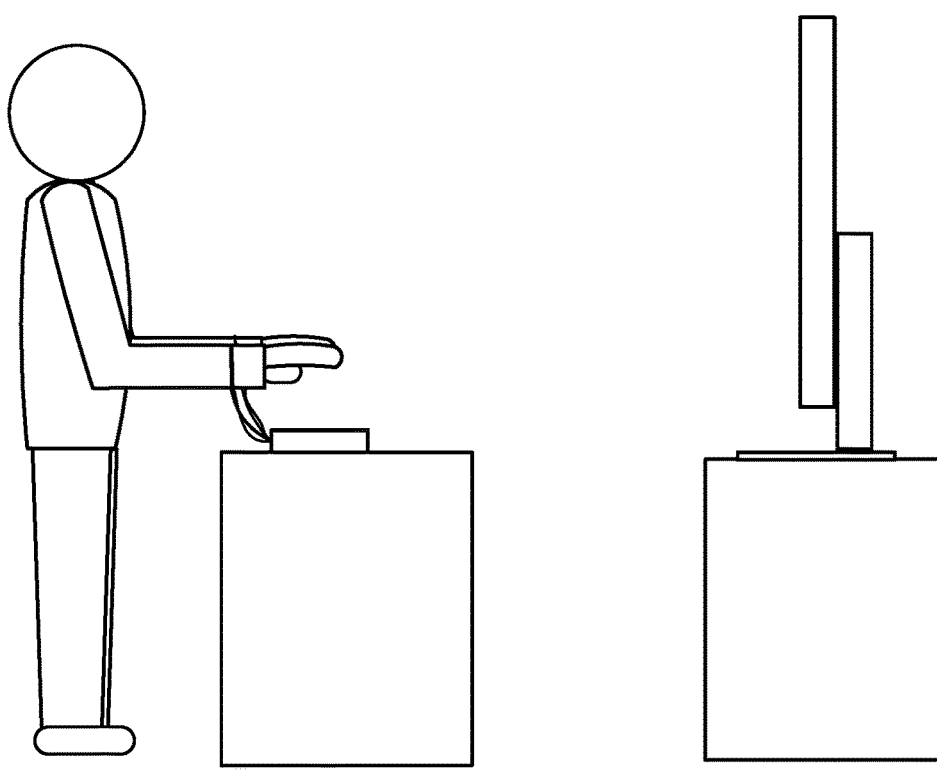

F I G.  1 6
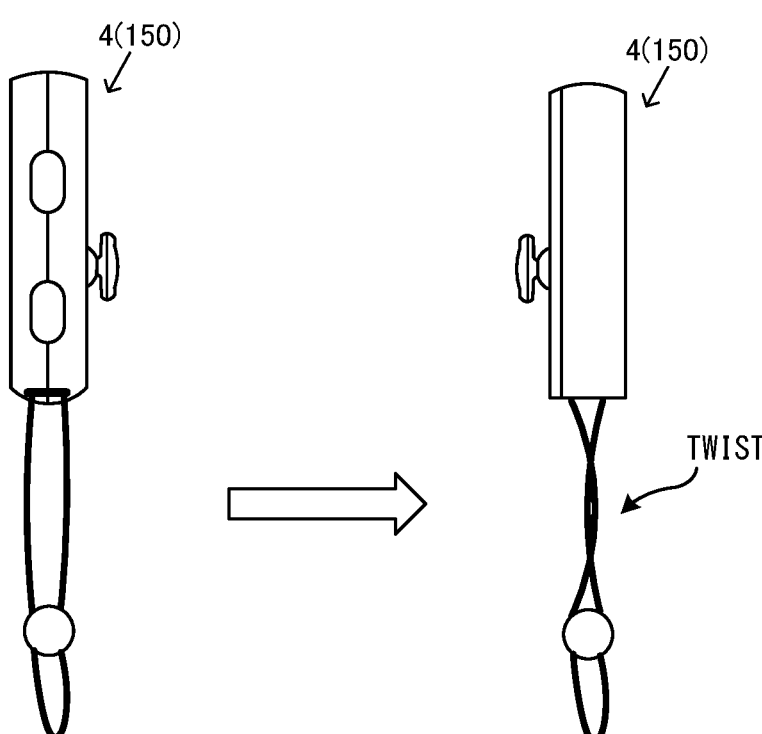

F I G. 1 7
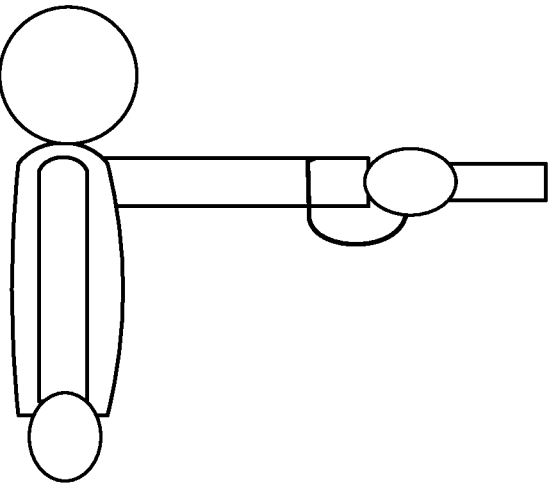
F I G. 1 8
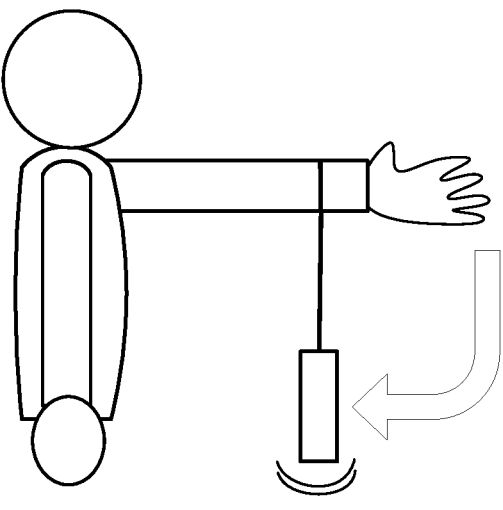

F I G.   1 9
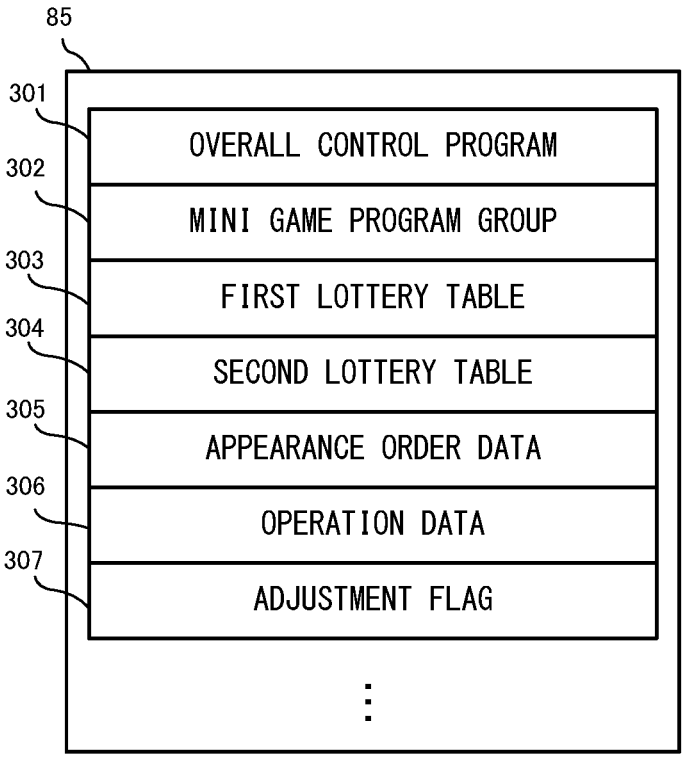

F I G.   2 0
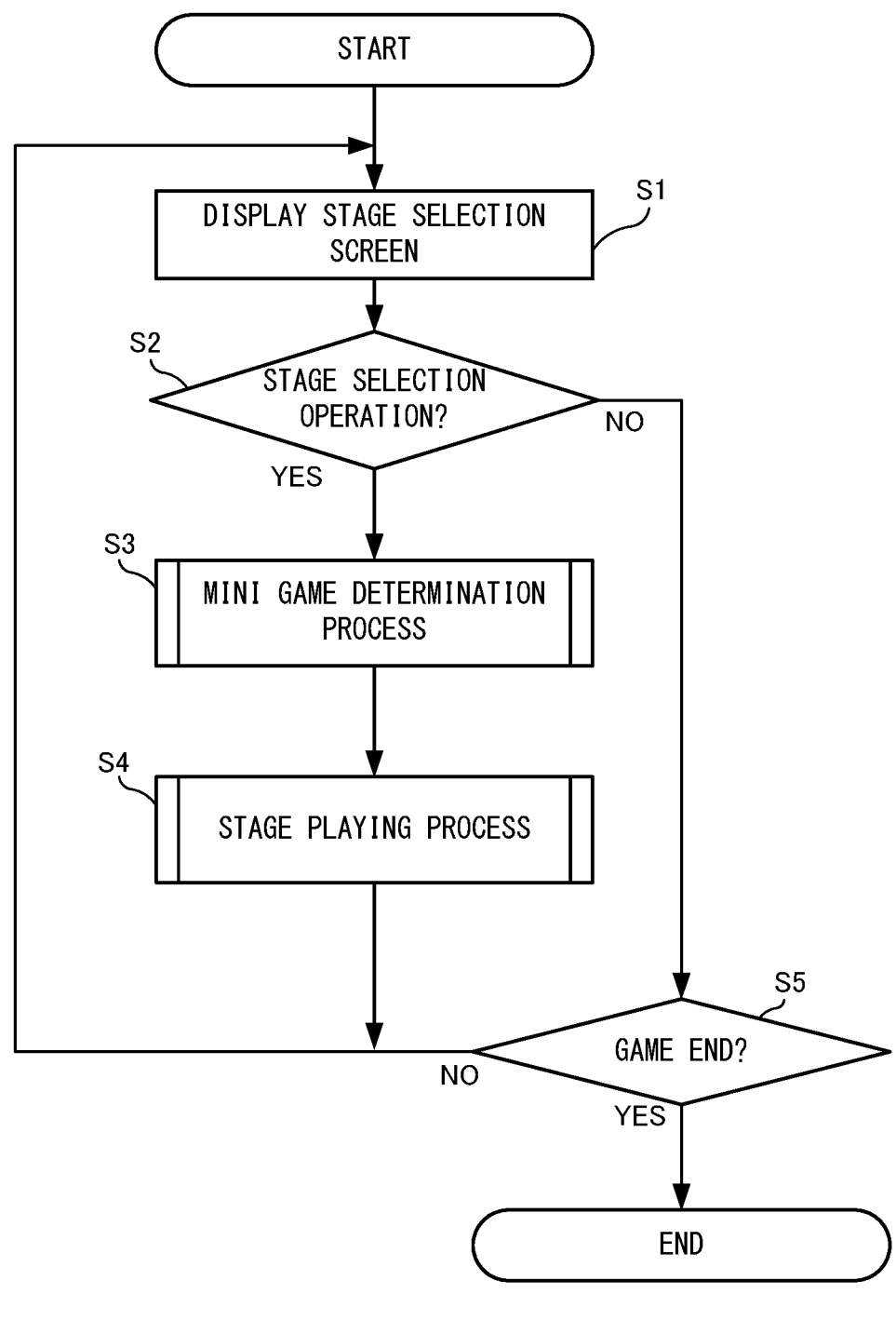

F I G.  2 1
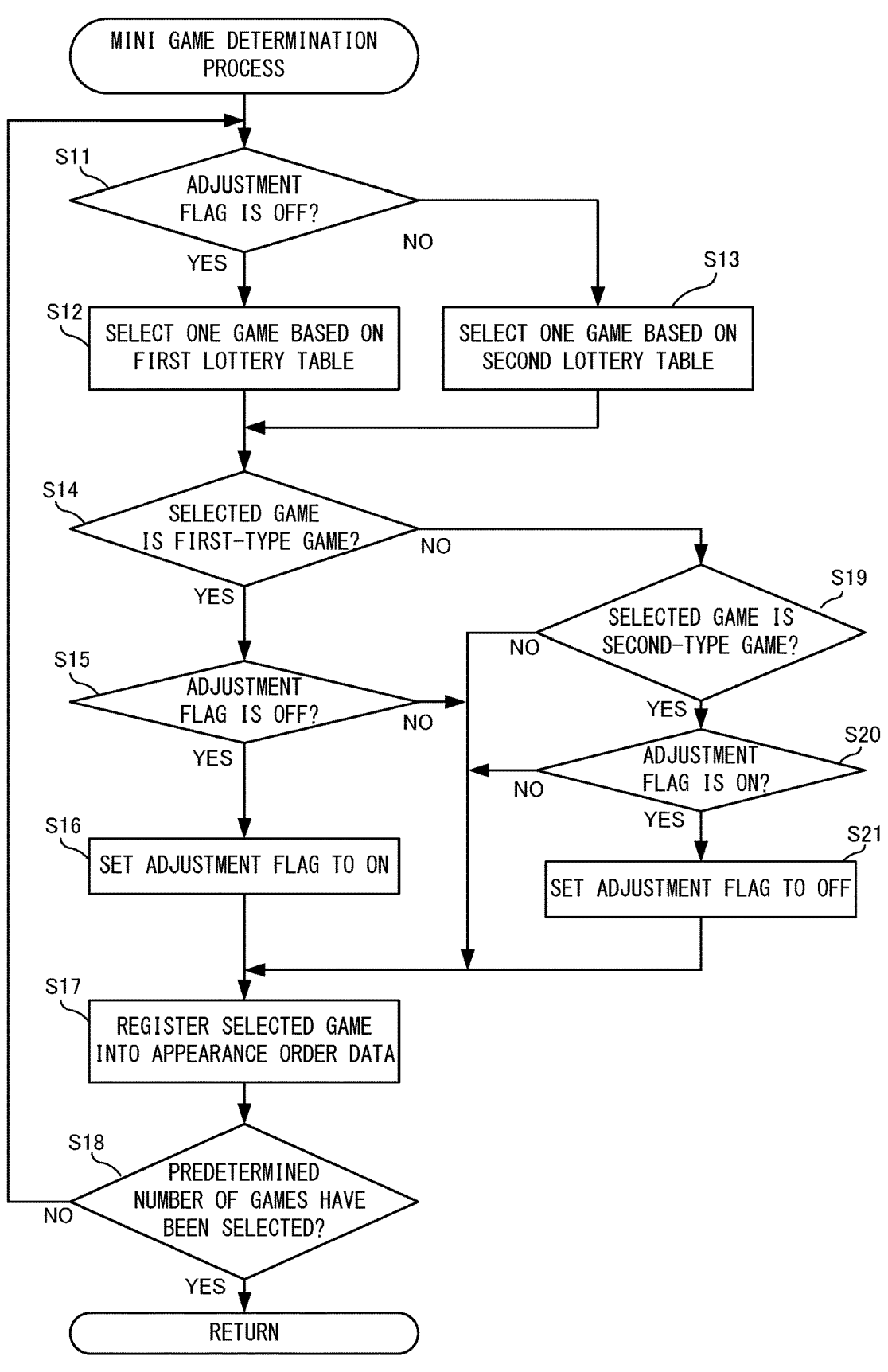

F I G.  2 2
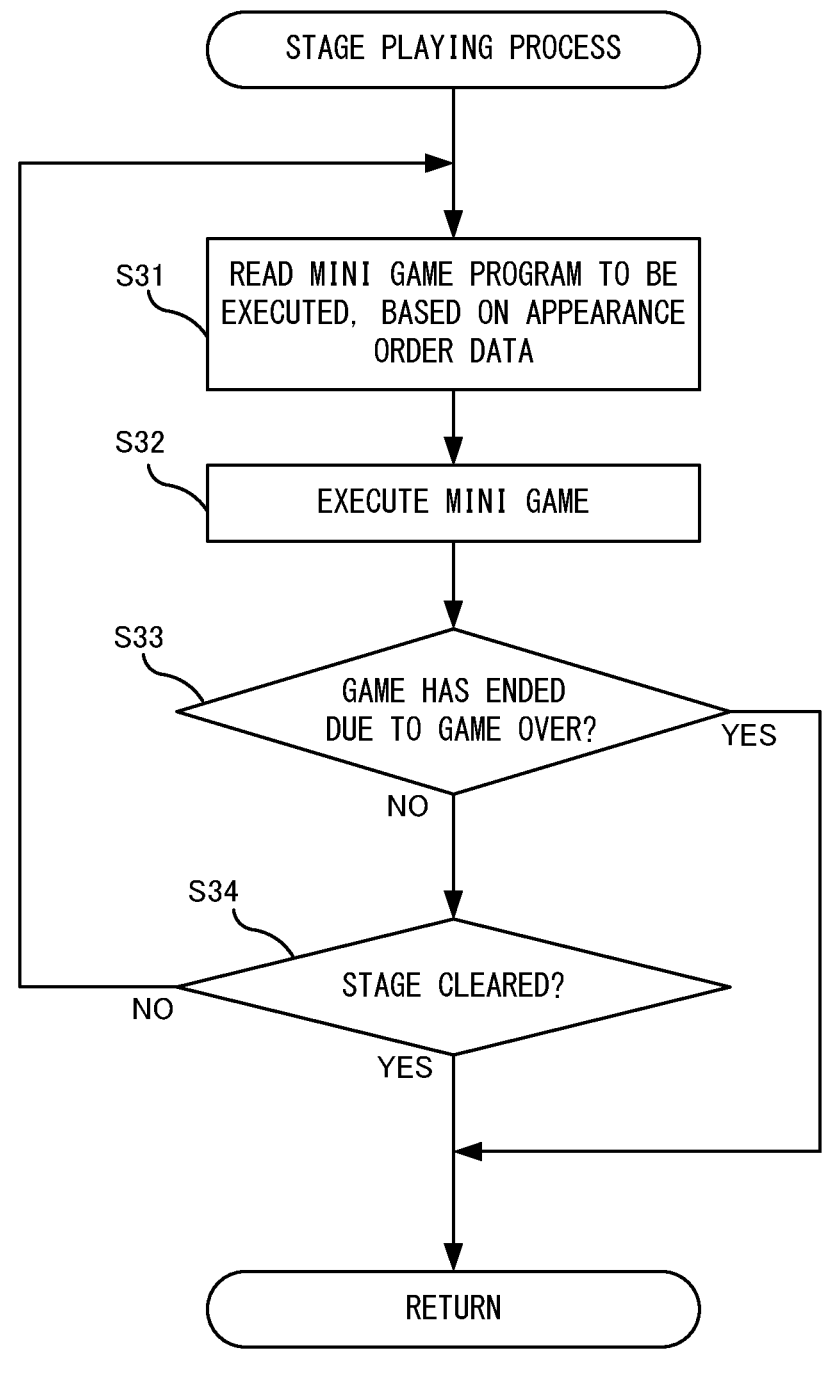

SYSTEMS AND METHODS OF ADAPTING THE APPEARANCE FREQUENCY OF A GAME TYPE WITH MOTION CONTROLLED GAMES

CROSS REFERENCE TO RELATED APPLICATION

This application claims priority to Japanese Patent Application No. 2023-121660 filed on Jul. 26, 2023, the entire contents of which are incorporated herein by reference.

FIELD

The present disclosure relates to game processing in which a plurality of types of games are continuously executed.

BACKGROUND AND SUMMARY

Hitherto, a game played by moving a controller having a strap and inertial sensors has been known. In addition, a game as described above, in which mini games each being played for (finished within) several seconds are continuously cleared, has also been known.

In the game as described above, the strap may be twisted during play of a mini game, and such a twist may be accumulated in the process of continuously clearing the mini games. In other words, it is conceivable that the mini games may include a game in which a certain problem, such as a twisting strap, may be naturally accumulated. In this regard, there is room for improvement in inhibiting accumulation of such a problem.

In view of the above, for example, the following configuration examples are exemplified.

(Configuration 1)

Configuration 1 is a computer-readable non-transitory storage medium having stored therein a game program causing a processor of an information processing apparatus to: sequentially determine appearing games that appear during continuous execution of a plurality of games, among a plurality of types of games; and continuously execute the appearing games having been determined. The appearing games are determined such that, if a second-type game does not appear after a first-type game has appeared, frequency of appearance of the first-type game is reduced.

According to the above configuration, in a game including, in a mixed manner, games of a type in which a certain problem is supposed to be naturally accumulated and games of a type in which the problem is naturally eliminated, appearance frequencies of the respective games can be set according to appearance states thereof. This inhibits the problem from being accumulated.

(Configuration 2)

According to Configuration 2, in the above Configuration 1, the game program may cause the processor to determine the appearing games such that, if the first-type game has appeared, appearance of the first-type game is inhibited until the second-type game appears.

According to the above configuration, it is possible to provide an opportunity of solving a problem while inhibiting the problem from being accumulated.

(Configuration 3)

According to Configuration 3, in the above Configuration 1 or 2, the game program may cause the processor to determine the appearing games such that appearance of the first-type game does not exceed a predetermined number of times, in a predetermined mode in which the second-type game does not appear, among game modes in which a plurality of types of games are continuously executed.

According to the above configuration, as for a certain problem assumed to be naturally accumulated, such accumulation can be reduced to a certain extent.

(Configuration 4)

According to Configuration 4, in any of the above Configurations 1 to 3, the game program may cause the processor to: display at least an action instruction indicating an action to be performed by a player in the game, based on operation data acquired from a controller with an inertial sensor, evaluate a motion of the controller according to the action, and progress the game on the basis of the evaluation.

According to the above configuration, it is possible to provide the player with fun of playing the game by moving the controller itself. Moreover, in such a game, it is possible to inhibit a situation where operability is degraded due to accumulation of a certain problem.

(Configuration 5)

According to Configuration 5, in the above Configuration 4, the controller may have a strap. The game program may cause the processor to display the action instruction that indicates an action of rotating the controller in a state where the controller is not held but is placed.

According to the above configuration, it is possible to provide, as the first-type game, a game in which an action of flipping a placed controller is evaluated to proceed the game.

(Configuration 6)

According to Configuration 6, in the above Configuration 5, the game program may cause the processor to display the action instruction that indicates an action of rotating the controller in a state where the controller is not held but is placed.

According to the above configuration, it is possible to provide, as the second-type game, a game in which an action of eliminating a twist of a strap is evaluated to proceed the game. If a certain problem has been naturally accumulated, this problem can be solved in a natural flow of game play without making the player conscious of a specific action to solve the problem, and moreover, accumulation of the problem can be inhibited.

(Configuration 7)

According to Configuration 7, in the above Configuration 5, in the second-type game, the game program may cause the processor to: display the action instruction that indicates an action of putting a wrist through the strap, and rotating the controller that is not held but is placed; and, at a predetermined timing during the game, display the action instruction that indicates an action of, from a state of holding the controller, releasing the hold on the controller.

According to the above configuration, it is possible to provide a game using various ways to move the controller. Moreover, it is possible to naturally solve a situation where a certain problem is accumulating, in the process of performing various actions according to the game to proceed the game.

According to the present disclosure, in a game including, in a mixed manner, games of a type in which a certain problem is supposed to be naturally accumulated and games of a type in which the problem is naturally eliminated, appearance frequencies of the respective games can be set according to appearance states thereof, thereby inhibiting the problem from being accumulated.

BRIEF DESCRIPTION OF THE DRAWINGS

FIG. 1 shows a non-limiting example of a state in which a left controller 3 and a right controller 4 are attached to a main body apparatus 2;

FIG. 2 shows a non-limiting example of a state in which the left controller 3 and the right controller 4 are detached from the main body apparatus 2;

FIG. 3 is six orthogonal views showing a non-limiting example of the main body apparatus 2;

FIG. 4 is six orthogonal views showing a non-limiting example of the left controller 3;

FIG. 5 is six orthogonal views showing a non-limiting example of the right controller 4;

FIG. 7 is a block diagram showing non-limiting examples of the internal configurations of the main body apparatus 2, the left controller 3, and the right controller 4;

FIG. 8 is a perspective view showing a non-limiting example of a strap unit 150;

FIG. 9 is a perspective view showing a non-limiting example of the strap unit 150;

FIG. 10 illustrates attachment of the strap unit 150;

FIG. 11 illustrates attachment of the strap unit 150;

FIG. 12 shows a non-limiting example of a game screen according to an exemplary embodiment;

FIG. 14 illustrates a flip action;

FIG. 15 illustrates the flip action:

FIG. 16 illustrates an example of a twist:

FIG. 17 illustrates an example of a hold releasing action;

FIG. 18 illustrates an example of the hold releasing action:

FIG. 19 is a memory map showing a non-limiting example of various data stored in a DRAM 85:

FIG. 20 is a flowchart showing the details of game processing according to the exemplary embodiment:

FIG. 21 is a flowchart showing the details of an order determination process; and FIG. 22 is a flowchart showing the details of a stage playing process.

DETAILED DESCRIPTION OF NON-LIMITING EXAMPLE EMBODIMENTS

Figure 6:
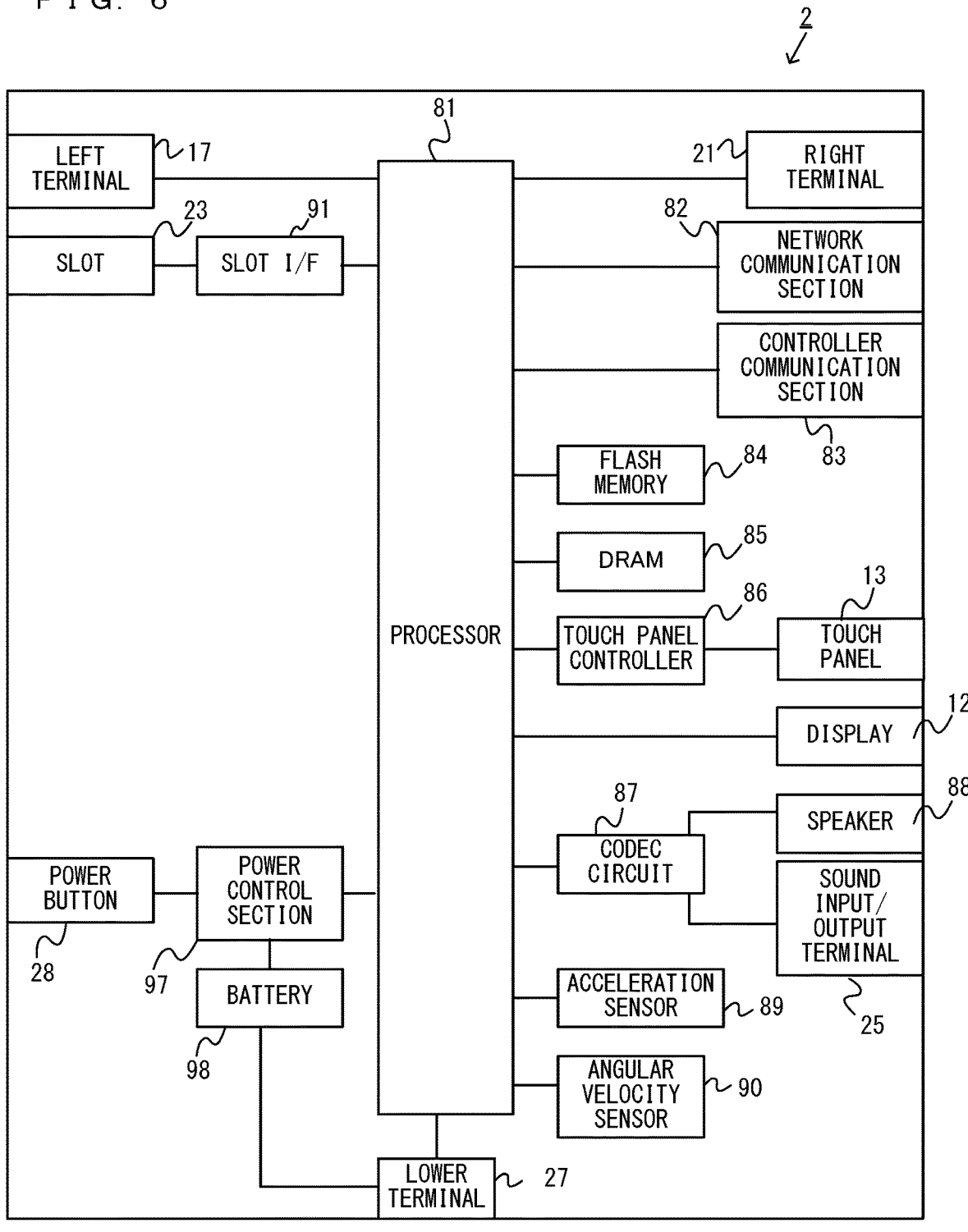
FIG. 6 is a block diagram showing a non-limiting example of the internal configuration of the main body apparatus 2.

Hereinafter, an exemplary embodiment will be described.

A game system according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment will be described, and then, the control of the game system 1 according to the exemplary embodiment will be described.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a player provides inputs.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. Hereinafter, the left controller 3 and the right controller 4 may be collectively referred to as "controller".

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

The shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single-touch input (e.g., resistive film type).

The main body apparatus 2 includes speakers (i.e., speakers 88 shown in FIG. 6) within the housing 11. As shown in FIG. 3, speaker holes 11a and 11b are formed in the main surface of the housing 11. Then, sounds outputted from the speakers 88 are outputted through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided at an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction shown in FIG. 4 (i.e., a z-axis direction shown in FIG. 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32 as an example of a direction input device. As shown in FIG. 4, the left stick 32 is provided on a main surface of the housing 31. The left stick 32 can be used as a direction input section with which a direction can be inputted. The player tilts the left stick 32 and thereby can input a direction corresponding to the direction of the tilt (and input a magnitude corresponding to the angle of the tilt). The left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction shown in FIG. 5 (i.e., the z-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and housed in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined method for communication (e.g., communication based on a unique protocol or infrared light communication). The wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2, and the left controller 3 and the right controller 4, is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of players can simultaneously provide inputs to the main body apparatus 2, each using a set of the left controller 3 and the right controller 4. As an example, a first player can provide an input to the main body apparatus 2 using a first set of the left controller 3 and the right controller 4, and simultaneously, a second player can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27 and power is supplied to the main body apparatus 2 via the lower terminal 27, the battery 98 is charged with the supplied power.

Figure 7:
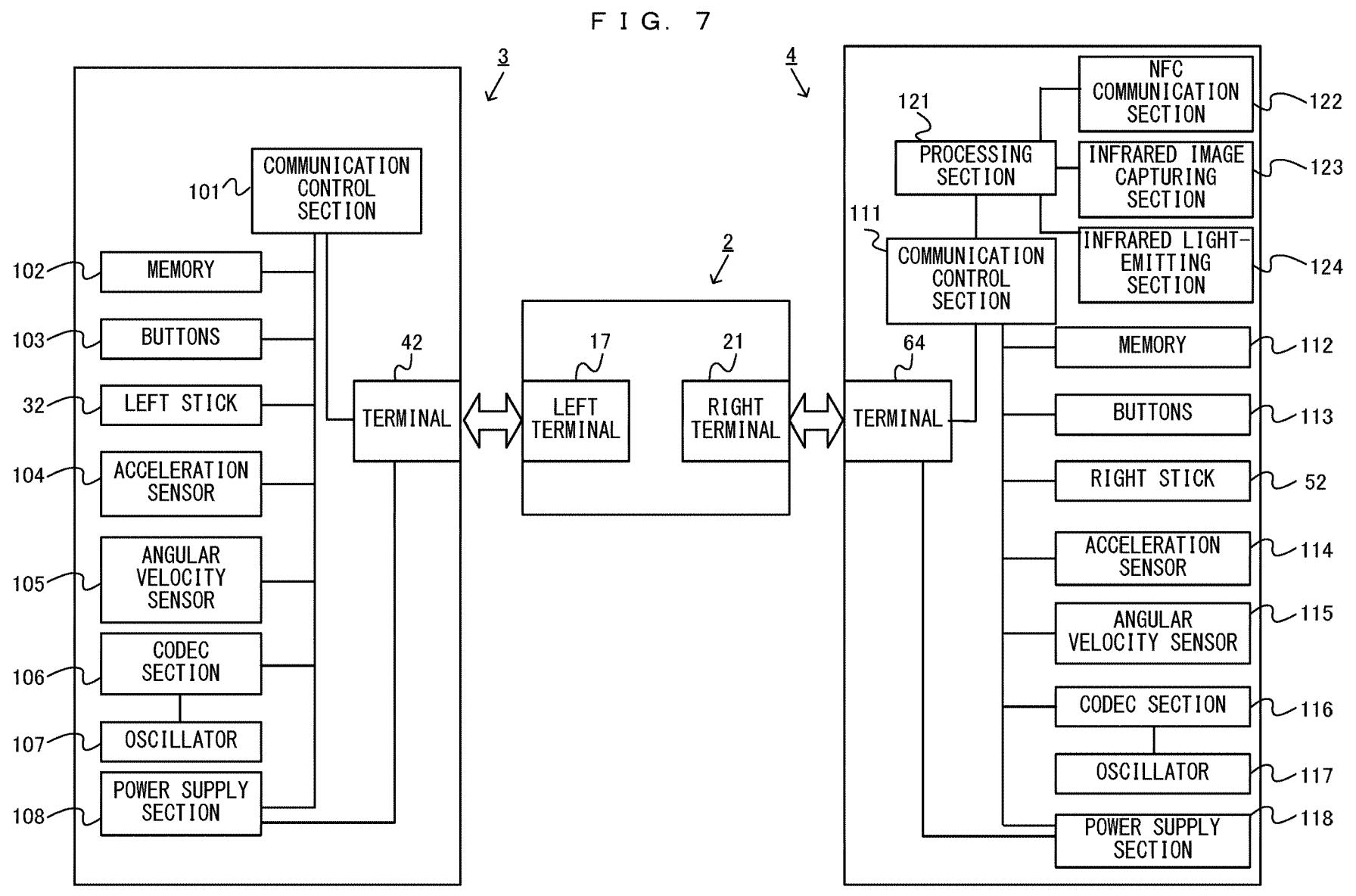

FIG. 7 is a block diagram showing examples of the internal configurations of the main body apparatus 2, the left controller 3, and the right controller 4. The details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x, y, z axes shown in FIG. 4) directions. The acceleration sensor 104 may detect an acceleration along one axial direction or accelerations along two axial directions. In the exemplary embodiment, the angular velocity sensor 105 detects angular velocities about predetermined three axes (e.g., the x, y, z axes shown in FIG. 4). The angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. The operation data is transmitted repeatedly, once every predetermined time. The interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

A strap unit can be attached to each of the left controller 3 and the right controller 4. FIG. 8 and FIG. 9 are perspective views showing a strap unit 150 for the right controller 4. FIG. 8 is a perspective view of the strap unit 150 as viewed from a left side surface and a rear side of the strap unit 150, and FIG. 9 is a perspective view of the strap unit 150 as viewed from a right side surface and a front side of the strap unit 150. The strap unit 150 includes a unit part 151, and a strap part 152 having a stopper. As shown in FIG. 10 and FIG. 11, the strap unit 150 is configured to be attachable to and detachable from a left side surface of the right controller 4. Specifically, the strap unit 150 is slid along a rail provided on the left side surface of the right controller 4 to be attached to and detached from the right controller 4. With the strap unit 150 being attached to the right controller 4 as shown in FIG. 11, the player puts his/her right wrist through the strap part 152, and adjusts the position of the stopper to prevent the strap part 152 from coming off from the wrist. Thus, the player can play the game while holding the right controller 4 with the strap being fixed to his/her wrist. Although FIG. 10 and FIG. 11 each show the right controller 4 with the strap unit 150, a strap unit (not shown) for the left controller 3 having the same configuration except that left and right are inverted is attachable to and detachable from the left controller 3.

In the following description, when a controller is referred to simply as "left controller 3" or "right controller 4", this controller is a controller to which the strap unit 150 shown in FIG. 11 is attached. In some cases, the left controller 3 and the right controller 4 to which the strap units 150 are attached are collectively referred to simply as "controller".

[Outline of Game Processing in Exemplary Embodiment]

Next, the outline of operation of the game processing executed by the game system 1 according to the exemplary embodiment will be described. First, the game of the exemplary embodiment is a game that the player plays with the controller to which the strap unit 150 is attached as described above, and it is premised that the strap is fixed to the wrist of the player. In addition, a motion of the controller detected based on the inertial sensor (in other words, the content of an action performed by the player) is evaluated, and the game is progressed based on the evaluation. Also, this game is a game in which a plurality of types of games may be continuously executed.

A rough flow of the game progress will be described. When the game has been started, firstly, a stage selection screen as shown in FIG. 12 is displayed. The stage selection screen is a screen obtained by looking down upon a virtual space. On the screen, a player character object 201 and a plurality of stage objects 204 are displayed. The player moves the player character object 201 to any of the stage objects 204 and performs an operation to start stage play, whereby the player can play the stage corresponding to the stage object 204. The player can progress the game by clearing the plurality of stages in order.

In the game, one stage is composed of a plurality of mini games. Each of the mini games is a game such that one play finishes within several seconds to several tens of seconds. In addition, each mini game is progressed while evaluating the motion of the controller as described above. In the game, the predetermined number of mini games are continuously executed. That is, the game provides the player with a way of playing in which the mini games are continuously and successively cleared.

In this embodiment, a case where one stage is composed of ten mini games, as an example of the predetermined number, will be described. The number of mini games may vary from stage to stage. When the player starts to play a predetermined stage, 10 types of mini games are selected by lottery from among 200 types of mini games, for example. One mini game is selected through one lottery. Therefore, ten lotteries are performed in total. The selected 10 types of mini games are continuously executed in the order as selected. In the same stage, the same mini game is not selected twice or more. Clearing the tenth mini game means clearing the stage. So to speak, the tenth mini game has a role of a so-called "stage boss". If game over occurs halfway, the player is regarded as having failed to clear the stage, and returns to the stage selection screen. If the player has cleared the stage, the player returns to the stage selection screen and goes to the next stage. For the stage that the player has cleared once, "endless mode" is released. The endless mode is a game mode that allows the player to continuously play the mini games until game over occurs. In the endless mode, the same mini game may be selected twice or more.

Figure 13:
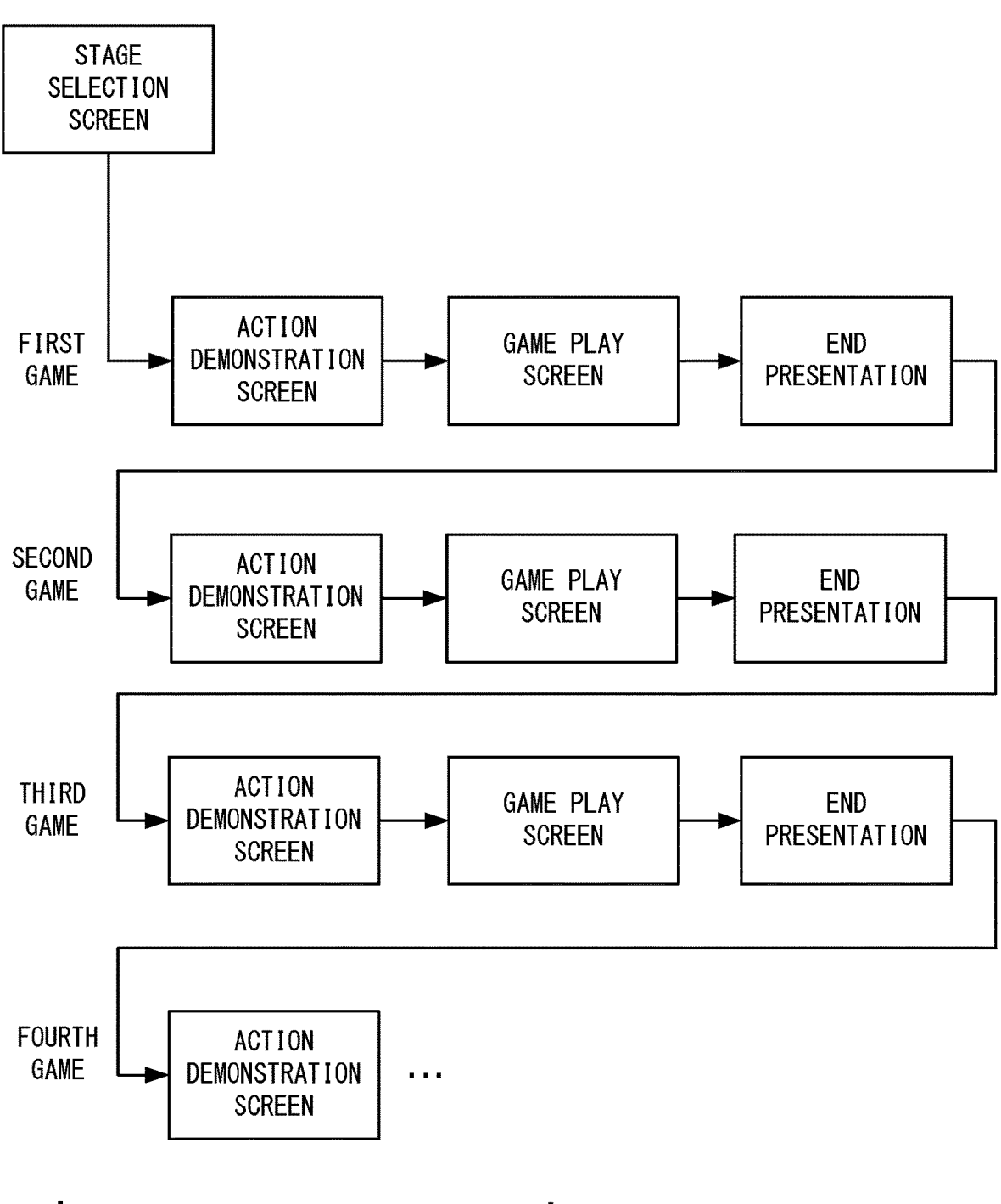
FIG. 13 is a schematic view showing transition of screens during stage play.

The flow of the game progress as described above will be more specifically described with reference to FIG. 13. FIG. 13 schematically shows transition of screens in the case where a predetermined stage is played. When an operation to select a (not-cleared) stage has been performed on the stage selection screen, firstly, 10 mini games to compose the stage are selected as described above. Thereafter, "action demonstration screen" of a mini game to be executed first is displayed. The action demonstration screen displays an action instruction indicating an action to be performed by the player (i.e., how to move the controller) in the mini game to be executed. So to speak, in advance of actually starting the mini game, an operation (motion) method in the mini game is displayed. After the action demonstration screen has been displayed for a predetermined time, the first mini game is automatically started, and a game play screen is displayed. When the first mini game has been cleared, end presentation indicating "game clear" is displayed. Thereafter, the second mini game is automatically started. In the second mini game, in advance of starting the play, an action demonstration screen according to the second mini game is displayed. Thereafter, a game play screen of the second mini game is displayed, and when the game has been cleared, end presentation regarding the second mini game is displayed. Thereafter, the third and subsequent mini games are progressed through the screen transitions in the order of the action demonstration screen, the game play screen, and the end presentation. When the tenth mini game has been cleared, the screen transitions to the stage selection screen. If game over occurs halfway, a game over representation screen is displayed and then the screen transitions to the stage selection screen.

Next, the above mini games will be described in more detail. It is assumed that, for example, 200 types (200 kinds) of mini games are prepared in this game. Each time a stage is started to be played, 10 types of mini games are selected by lottery. Therefore, even when the same stage is played, 10 mini games to be executed may vary from play to play.

In the exemplary embodiment, the 200 types of mini games are roughly classified into three types of games as follows.

(1) First-type game: a mini game in which "flip action" is required (2) Second-type game: a mini game in which "hold releasing action" is required (3) Third type of game: a mini game in which neither "flip action" nor "hold releasing action" are required Hereinafter, the respective types of games will be described.

[First-Type Game]

The first-type game is conceptually a mini game in which an action that causes a twist of the strap part 152 of the strap unit 150 is required. In the exemplary embodiment, as an example of the mini game, a mini game that requires an action of flipping the controllers placed on a desk or the like (turning the controllers around the y-axis in FIG. 4 and FIG. 5 to front-back invert the controllers) as shown in FIG. 14 and FIG. 15, is assumed. FIG. 14 is a schematic view in which the desk on which the controllers are placed is seen from above, and FIG. 15 is a schematic view in which the same situation is seen from the right side of the player. From the position shown in FIG. 15, the player performs an action of picking up the controllers with right and left hands and flipping the controllers, at a predetermined timing. This action causes a twist of the strap part 152 as shown in FIG. 16, for example. In the exemplary embodiment, such an action is referred to as "flip action". An example of the first-type game is a mini game in which a controller is used like a "card" in the virtual space, and the card is flipped at an appropriate timing. On the action demonstration screen regarding the first-type game, an action instruction indicating the flip action is displayed.

[Second-Type Game]

Next, the second-type game is conceptually a mini game in which, if the strap part 152 is twisted, an action for eliminating the twist is required. In the exemplary embodiment, as an example of the mini game, a mini game that requires the player holding the controller as shown in FIG. 17 to perform an action of releasing his/her hold on the controller as shown in FIG. 18, is assumed. In the exemplary embodiment, this action is referred to as "hold releasing action". Although FIG. 17 and FIG. 18 show the "hold releasing action" regarding the left hand, the player may perform the "hold releasing action" with both hands depending on the content of the mini game. When the strap part 152 has a twist, the "hold releasing action" causes restoring force against the twist to act on the released controller, whereby the effect of eliminating the twist can be expected. An example of the second-type game is a mini game in which a controller is used like a "ball" in the virtual space, and the player releases the hold on the ball at an appropriate timing to let the ball fall. On the action demonstration screen regarding the second-type game, an action instruction indicating the hold releasing action is displayed.

[Third-Type Game]

The third-type game is a mini game that requires neither the "flip action" nor the "hold releasing action". The third-type game is, for example, a mini game that requires the player to perform an action of waving his/her hand while holding a controller, an action of moving his/her hand so as to draw a predetermined trajectory, an action of thrusting his/her hand forward from behind, or the like. That is, the third-type game is a mini game that requires various actions that do not correspond to the "flip action" and the "hold releasing action". On the action demonstration screen regarding the third-type game, an action instruction indicating the action required for the mini game is displayed.

[Types of Actions Required in Mini Games]

As for the types of actions required of the player during mini games, some mini games require only one type of action while the other mini games require a plurality of types of actions. Among the mini games that require a plurality of types of actions, a mini game that requires at least the "hold releasing action" is treated as the "second-type game", and a mini game that does not require the "hold releasing action" but requires at least the "flip action" is treated as the "first-type game". Therefore, a mini game that requires both the "flip action" and the "hold releasing action" is treated as the "second-type game". Moreover, in a mini game in which a plurality of types of actions are required and the actions are to be performed as a series of actions, an action instruction that causes the plurality of types of actions to be performed as a series of actions, may be displayed.

[Control of Lottery for Mini Games]

Meanwhile, when the "flip action" has been performed in playing the first-type game, a twist of the strap part 152 is generated as described above. Therefore, for example, in the case where the first mini game was the first-type game, when starting the second game, the player performs a predetermined action required in the second game while holding the controller with the strap part 152 being twisted. At this time, it is conceivable that, depending on the state of the twist, a linear distance from the position of the stopper fixed to the wrist to the position of the root of the strap part 152 on the strap unit side becomes shorter than that when the twist is not generated. Therefore, some people may feel tightness as if his/her wrist is being pulled, and such feeling may disrupt the concentration in playing the game. Moreover, the linear distance being short somewhat reduces the range in which the player can move the controller when re-gripping the controller, which may make the player feel difficulty in re-gripping the controller. As a result, operability may be degraded depending on the content of the mini game.

Meanwhile, in the second-type game, since the action of releasing the hold on the controller is performed as described above, even if the strap part 152 is twisted, the effect of eliminating the twist can be expected. In other words, it can be said that the first-type game is a "game that causes a twist", and the second-type game is a "game that eliminates the twist". Therefore, elimination of the twist can be expected by executing the second-type game after the first-type game has been executed. This inhibits occurrence of a situation where the game play is continued with the operability being reduced.

Here, for example, in selecting 10 mini games by lottery as described above, a control may be performed such that, when the first-type game has been selected, a mini game to be selected next is always the second-type game. In this case, however, entertainment characteristics of the game owing to that the player cannot know which mini game will appear next (randomness) may be degraded. That is, while playing the game repeatedly, the player can expect that the second-type game will come after the first-type game, which may degrade the fun brought about by the player not knowing which game will appear next.

In the exemplary embodiment, when 10 mini games are selected by lottery in playing the stage described above, a control as follows is performed. That is, when the first-type game has been selected as a result of lottery, the first-type game is made hard to be selected until the second-type game is selected in a succeeding lottery. In other words, in the case where the second-type game has not yet appeared after the first-type game appeared, the frequency of appearance of the first-type game is reduced. For example, a breakdown of 200 mini games is assumed to be 20 first-type games, 20 second-type games, and 160 third-type games. In addition, it is assumed that a first lottery table in which the selection rate of each game is set to 0.5% is prepared. Then, when selecting the first game by lottery, the lottery is performed using the first lottery table, and the first-type game is selected as a result of the lottery. In this case, when selecting the second game by lottery, the lottery is performed using a second lottery table in which the selection rate of the first-type game is reduced. For example, in the second lottery table, the selection rate of the first-type game is set to 0.05%. Since the selection rate is reduced, the appearance frequency of the first-type games is reduced. Then, if the second-type game has been selected as the second game, the lottery table to be used for the third game is returned to the first lottery table. That is, the appearance frequency of the first-type games is returned. Meanwhile, if the second-type game has not been selected as the second game, lottery using the second lottery table is continued until the second-type game is selected. In other words, when the second-type game has not been selected, any mini game is selected from among the first-type games and the third-type games. In such a case, a control is performed such that the appearance frequency of the first-type games is reduced. Specifically, the control is performed as follows. That is, while lottery is usually performed using the first lottery table, if the first-type game has been selected, a succeeding lottery is performed using the second lottery table until the second-type game is selected, whereby the selection rate of the first-type games is reduced. When the second-type game has been selected, the lottery table is returned to the first lottery table.

The specific value of the selection rate in the above lottery table, particularly, the second lottery table, may vary from stage to stage. That is, the lottery table may have any value as long as the table is adjusted to make the first-type games hard to be selected. Instead of the above lottery tables, a type lottery table for selecting any "type" of the first-type game, the second-type game, and the third-type game may be used. In this case, after the "type" of mini games is selected by using the type lottery table, a mini game may be selected by using a mini game lottery table according to each type. In this case, a first lottery table and a second lottery table as described above may be prepared for the type lottery table.

The control method for making the first-type games hard to be selected, that is, the control method for reducing the appearance frequency of the first-type games, is not limited to the above method, and a method as follows may be used, for example. Firstly, a method in which the selection rate of all the first-type games is set to 0% in the second lottery table, may be used. In the method described above, there is a possibility that two or more first-type games (having different contents) may be selected before the second-type game is selected, although the probability is low. In this case, the twist as described above may be accumulated, which may lead to further reduction in operability. In this regard, by setting the selection rate of all the first-type games to 0%, it is possible to allow the first-type game to be selected only when the second-type game is selected after the first-type game has been selected once, thereby inhibiting further accumulation of twist.

In another method, for example, in the case where a stage in which the second-type games are inhibited from appearing is played, the selection rate of the first-type games may be set to 0% when the number of times the first-type games were selected has reached a predetermined number of times. Moreover, for example, in a stage in which both the first-type games and the second-type games may appear, when the number of times the first-type games were selected has reached the predetermined number of times without the second-type game having been selected, the selection rate of the first-type games may be set to 0% until the second-type game is selected. For example, in the lottery using the first lottery table, when the first-type games have been selected three times without the second-type game having been selected, a succeeding lottery may be performed with the selection rate of the first-type games being 0%. Thus, it is possible to provide a game taking into account the balance between randomness of appearance of the 200 types of mini games, and (allowable) accumulation of twist.

[Details of Game Processing of Exemplary Embodiment]

Next, the game processing according to the exemplary embodiment will be described in more detail with reference to FIG. 19 to FIG. 22.

[Data to be Used]

Firstly, various kinds of data to be used in the game processing will be described. FIG. 19 is a memory map showing an example of various kinds of data stored in the DRAM 85 of the main body apparatus 2. In the DRAM 85 of the main body apparatus 2, an overall control program 301, a mini game program group 302, a first lottery table 303, a second lottery table 304, appearance order data 305, operation data 306, an adjustment flag 307, etc., are stored.

The overall control program 301 is a program for overall control of the game processing in the exemplary embodiment. Specifically, the overall control program 301 is a program for executing processing shown in the flowchart of FIG. 20 described later.

The mini game program group 302 is a group of game programs corresponding to the respective mini games described above.

The first lottery table 303 is a lottery table in which the selection rate of the first-type games is not adjusted. The second lottery table 304 is a lottery table that is adjusted such that the first-type games are hardly selected. That is, the selection rate of the first-type games in the second lottery table 304 is set to be lower than the selection rate of the first-type games in the first lottery table 303. For example, in the second lottery table 304, the selection rate of the first-type games is set to 0% as described above.

The appearance order data 305 is data indicating a lottery result and an execution order of 10 mini games to be performed when the aforementioned stage is played. The appearance order data 305 includes, for example, information specifying the selected mini games in the order in which the mini games were selected. The selection order is the order in which the mini games appear (are executed).

The operation data 306 is data obtained from the controller. Specifically, the operation data 306 includes at least right inertial sensor data and left inertial sensor data. The right inertial sensor data is data indicating the detection results of the inertial sensors such as the acceleration sensor 114 and the angular velocity sensor 115 of the right controller 4. Specifically, the right inertial sensor data includes acceleration data for three axes and angular velocity data for three axes. The left inertial sensor data is data indicating the detection results of the inertial sensors such as the acceleration sensor 104 and the angular velocity sensor 105 of the left controller 3. In addition, although not shown in the figure, the operation data 306 also includes data indicating pressed states of various buttons, and the like.

When lottery for a mini game is performed, the adjustment flag 307 is a flag indicating whether or not the lottery is performed with the selection rate of the first-type games being adjusted.

In addition, various kinds of data required for the game processing are also generated as appropriate and stored in the DRAM 85.

[Details of Processing Executed by Processor 81]

Next, the details of the game processing in the exemplary embodiment will be described. Here, control related to the above-described lottery for mini games will be mainly described, and the description of various other types of game processing is omitted. Moreover, flowcharts described below are merely an example of the processing. Therefore, the order of each process step may be changed as long as the same result is obtained. In addition, the values of variables and thresholds used in determination steps are also merely examples, and other values may be used as necessary.

FIG. 20 is a flowchart showing the details of the game processing according to the exemplary embodiment. In FIG. 20, firstly, in step S1, the processor 81 displays the stage selection screen as shown in FIG. 12. Next, in step S2, the processor 81 determines, based on the operation data 306, whether or not an operation to select a predetermined stage to be played (stage selection operation) has been performed. When the determination result is that the stage selection operation has been performed (YES in step S2), the processor 81 executes a mini game determination process in step S3. This is a process for determining by lottery a mini game group to be executed in the selected stage.

FIG. 21 is a flowchart showing the details of the mini game determination process. In step S11 in FIG. 21, the processor 81 determines whether or not the adjustment flag 307 is OFF. When the determination result is that the adjustment flag 307 is OFF (YES in step S11), the processor 81 selects one mini game by using the first lottery table in step S12. Meanwhile, when the adjustment flag 307 is ON (NO in step S12), the processor 81 selects one mini game by using the second lottery table 304 in step S13. That is, the lottery is performed with the lottery table in which the selection rate of the first-type games is reduced. Here, as the content of the second lottery table 304, the selection rate of the first-type games is set to 0%.

Next, in step S14, the processor 81 determines whether the game selected as the result of the lottery in step S12 or step S13 is the first-type game. When the determination result is that the selected game is the first-type game (YES in step S14), the processor 81 determines in step S15 whether or not the adjustment flag 307 is OFF. When the determination result is that the adjustment flag 307 is OFF (YES in step S15), the processor 81 sets the adjustment flag 307 to ON in step S16. Thereafter, the process proceeds to step S17 described later.

The above description is based on the assumption that the stage to be played is a stage in which both the first-type games and the second-type game may appear. In this regard, if the stage to be played is a stage in which the second-type games are inhibited from appearing, the number of times the first-type games were selected may be counted, and the adjustment flag 307 may be set to ON when the number of times has reached a predetermined number of times. That is, for the stage in which no second-type game appears, a control may be performed such that appearance of first-type games does not exceed the predetermined number of times.

When the determination result in step S15 is that the adjustment flag 307 is ON (NO in step S15), the process proceeds to step S17 described later.

Meanwhile, when the determination result in step S14 is that the selected game is not the first-type game (NO in step S14), the processor 81 determines in step S19 whether or not the selected game is the second-type game. When the determination result is that the selected game is the second-type game (YES in step S19), the processor 81 determines in step S20 whether or not the adjustment flag 307 is ON. When the determination result is that the adjustment flag 307 is ON (YES in step S20), the processor 81 sets the adjustment flag 307 to OFF in step S21. Thereafter, the process proceeds to step S17 described later. Even when the determination result is that the adjustment flag 307 is OFF (NO in step S20), the process proceeds to step S17 described later.

Next, in step S17, the processor 81 registers the selected mini game in the appearance order data 305.

Next, in step S18, the processor 81 determines whether or not the lottery for selecting a predetermined number of (ten in this example) mini games for one stage has been completed. When the determination result is that the lottery has not yet been completed (NO in step S18), the processor 81 returns to step S11 and repeats the steps. When the lottery for the predetermined number of mini games has already been completed (YES in step S18), the mini game determination process is ended.

Referring back to FIG. 20, in step S4, the processor 81 executes a stage playing process. FIG. 22 is a flowchart showing the details of the stage playing process. In FIG. 22, firstly, in step S31, the processor 81, based on the appearance order data 305, reads a mini game program for a mini game to be executed next, into the DRAM 85.

Next, in step S32, the processor 81 executes the read mini game. In processing the mini game, as described above, firstly, the action demonstration screen is displayed, and then the play of the mini game is automatically started. Thereafter, an end presentation is displayed when the mini game has been cleared or game over occurs, whereby execution of the mini game is ended.

Next, in step S33, the processor 81 determines whether or not the mini game has ended because of game over. When the determination result is that the mini game has ended because of game over (YES in step S33), the processor 81 ends the stage playing process. If the mini game has ended not because of game over (NO in step S33), it is considered that the mini game has been cleared and ended. In this case, in step S34, the processor 81 determines whether or not the condition for stage clear has been satisfied. In this example, it is determined whether or not the tenth mini game has been cleared. When the determination result is that the condition for stage clear has not been satisfied (NO in step S34), the processor 81 returns to step S31, and repeats the steps. That is, the subsequent mini games are continuously executed in turn. Meanwhile, when the condition for stage clear has been satisfied (YES in step S34), the processor 81 ends the stage playing process. At this time, a predetermined stage clear presentation may be displayed. If it is the first-time clear of the stage, setting is made to allow the aforementioned endless mode.

Referring back to FIG. 20, when the stage playing process had ended, the processor 81 returns to step S1 and repeats the steps. The content of the adjustment flag 307 is not reset even when the stage has been cleared, and is carried over to a mini game lottery process that follows. For example, it is assumed that the ninth mini game and the tenth mini game in the first stage are the first-type game and the third-type game, respectively. When the player has cleared the first stage and starts to play the second stage, lottery for the first mini game is performed with the adjustment flag 307 being ON. In another embodiment, when a stage has been cleared, the content of the adjustment flag 307 may be reset.

On the other hand, when the determination result in step S2 is that no stage selection operation has been performed (NO in step S2), the processor 81 determines in step S5 whether or not an operation to end the game has been performed. When the operation to end the game has not been performed (NO in step S5), the processor 81 returns to step S1, and repeats the steps. When the operation to end the game has been performed (YES in step S5), the processor 81 ends the game processing.

As described above, when the player plays a plurality of types of games by moving a controller with a strap, a game in which the strap may be twisted and a game in which the twist is eliminated may be mixed. In the exemplary embodiment, the frequency of appearance of the game in which the strap may be twisted is set according to the appearance state. Therefore, while the game play is being naturally proceeded, even if a twist of the strap is generated, such a twist is inhibited from being accumulated. Moreover, an opportunity of eliminating the twist before accumulation can be increased.

Modifications

In the above embodiment, when play of a stage is started, a predetermined number of mini games that constitute the stage are selected by lottery. In this regard, in another embodiment, each time one game has ended, a next mini game may be selected by lottery. In this case, lottery for each game is performed after a control for adjusting the selection rate has been performed. Alternatively, for example, in the aforementioned "endless mode", each time one game has ended, a next mini game may be selected by lottery.

In the above embodiment, the second lottery table 304 that has been defined in advance is used. In another embodiment, the content corresponding to the second lottery table 304 may be dynamically generated or set according to the selection state of the first-type game. For example, when the first-type game has been selected, the selection rate regarding the first-type game may be calculated again by using a predetermined coefficient that reduces the selection rate of the first-type game. Thereafter, the selection rate of the first-type games may be calculated again such that the selection rate is gradually reduced as the number of times the first-type games are selected is increased with the second-type games being not selected.

In the above embodiment, as for a timing to display an action instruction indicating an action to be performed by the player, the action instruction is displayed on an action demonstration screen before play of a mini game is started. However, the action display may be performed at a predetermined timing during the game play. Then, the player may perform the action along the action instruction, in accordance with the timing at which the action instruction is displayed. For example, a mini game in which both the "flip action" and the "hold releasing action" are required is assumed. In this case, an action instruction for the "flip action" may be displayed on the action demonstration screen, and an action instruction for the "hold releasing action" may be displayed at a predetermined timing during play of the mini game.

The above embodiment has been described by using the first-type game in which the strap may be twisted, and the second-type game in which the twist may be eliminated. However, the process for adjusting the appearance frequency as described above is applicable to a case where games to be continuously played are selected from a group of games including: a game requiring an action that may cause and accumulate any problem (leading to reduction in operability) not limited to a twist of a strap; and a game that includes an action by which the problem is naturally eliminated.

In the above embodiment, the case where the series of processes related to the game processing is performed in the single main body apparatus 2 has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses. In addition, a so-called cloud gaming configuration may be adopted. For example, the main body apparatus 2 may be configured to send operation data indicating a player's operation to a predetermined server, and the server may be configured to execute various kinds of game processing and stream the execution results as video/audio to the main body apparatus 2.

While the present disclosure has been described in detail, the foregoing description is in all aspects illustrative and not restrictive. It is to be understood that numerous other modifications and variations can be devised without departing from the scope of the present disclosure.

What is claimed is:

1. A computer-readable non-transitory storage medium having stored therein a game program for adaptively sequencing games during continuous execution across a plurality of games that rely on motion of a controller for input, the game program configured to cause a processor of an information processing apparatus to perform operations comprising to:

sequentially selecting which games appear during continuous execution of a plurality of games, wherein the plurality of games includes different types of games, which include at least a first plurality of first-type games, and a second plurality of second-type games;

continuously executing the plurality of games that have been selected;

during the continuous execution of the plurality of games, determining that a game from the first plurality of first-type games has been selected, wherein the first plurality of first-type games includes processing for an action that, when performed by moving the controller, contributes to accumulation of a physical condition of the controller;

based on determining that the selected game is from the first plurality of first-type games, adaptively adjusting a frequency by which those games included with the first plurality of first-type games are selectable as part of a subsequent selection during the continuous execution of the plurality of games; and counteracting the adjustment of the frequency by which the first plurality of first-type games is selectable based on selection of a game from the second plurality of second-type games, wherein the second plurality of second-type games includes processing for an action that, when performed, counteracts accumulation of the physical condition of the controller.

2. The computer-readable non-transitory storage medium according to claim 1, wherein, based on selection of a game of the first-type games, the first-type games are inhibited from selection until a game from the second-type game is selected.

3. The computer-readable non-transitory storage medium according to claim 1, wherein the operations further comprise:

determining the appearing games such that appearance of the first-type games does not exceed a predetermined number of times, in a predetermined mode in which the second-type games do not appear, among game modes in which a plurality of types of games are continuously executed.

4. The computer-readable non-transitory storage medium according to claim 1, wherein the operations further comprise:

displaying at least an action instruction indicating an action to be performed by a player in the game;

based on operation data acquired from a controller with an inertial sensor, evaluating a motion of the controller according to the action; and progressing the game on the basis of the evaluation.

5. The computer-readable non-transitory storage medium according to claim 4, wherein the controller includes a strap, and in the first-type games, the operations further comprise displaying the action instruction that indicates an action of rotating the controller in a state where the controller is not held but is placed.

6. The computer-readable non-transitory storage medium according to claim 5, wherein in the second-type games, the operations further comprise displaying the action instruction that indicates an action of releasing hold on the controller that is held by the player with his/her wrist being put through the strap.

7. The computer-readable non-transitory storage medium according to claim 5, wherein the operations further comprise:

in the second-type game displaying the action instruction that indicates an action of putting a wrist through the strap, and rotating the controller that is not held but is placed; and at a predetermined timing during the game, displaying the action instruction that indicates an action of, from a state of holding the controller, releasing the hold on the controller.

8. A game system for adaptively sequencing games during continuous execution across a plurality of games that rely on motion of a controller for input, the game system comprising a processor and a memory, the memory comprising instructions that are configured to cause the processor to perform operations comprising:

sequentially selecting which games appear during continuous execution of a plurality of games, wherein the plurality of games includes different types of games, which include at least a first plurality of first-type games, and a second plurality of second-type games;

continuously executing the plurality of games that have been selected;

during the continuous execution of the plurality of games, determining that a game from the first plurality of first-type games has been selected, wherein the first plurality of first-type games includes processing for an action that, when performed by moving the controller, contributes to accumulation of a physical condition of the controller;

based on determining that the selected game is from the first plurality of first-type games, adaptively adjusting a frequency by which those games included with the first plurality of first-type games are selectable as part of a subsequent selection during the continuous execution of the plurality of games; and counteracting the adjustment of the frequency by which the first plurality of first-type games is selectable based on selection of a game from the second plurality of second-type games, wherein the second plurality of second-type games includes processing for an action that, when performed, counteracts accumulation of the physical condition of the controller.

9. The game system according to claim 8, wherein based on selection of a game of the first-type games, the first-type games are inhibited from selection until a game from the second-type game is selected.

10. The game system according to claim 8, wherein the operations further comprise:

determining the appearing games such that appearance of the first-type games does not exceed a predetermined number of times, in a predetermined mode in which the second-type games do not appear, among game modes in which a plurality of types of games are continuously executed.

11. The game system according to claim 8, wherein the operations further comprise:

displaying at least an action instruction indicating an action to be performed by a player in the game, based on operation data acquired from a controller with an inertial sensor, evaluating a motion of the controller according to the action, and progressing the game on the basis of the evaluation.

12. The game system according to claim 11, wherein the controller includes a strap, and wherein the operations further comprise: in the first-type game, displaying the action instruction that indicates an action of rotating the controller in a state where the controller is not held but is placed.

13. The game system according to claim 12, wherein in the second-type games, the operations further comprise displaying an action of releasing hold on the controller that is held by the player with his/her wrist being put through the strap.

14. The game system according to claim 12, wherein the operations further comprise:

in the second-type game:

displaying the action instruction that indicates an action of putting a wrist through the strap, and rotating the controller that is not held but is placed, and at a predetermined timing during the game, displaying the action instruction that indicates an action of, from a state of holding the controller, releasing the hold on the controller.

15. A game apparatus for adaptively sequencing games during continuous execution across a plurality of games that rely on motion of a controller for input, the game system comprising:

a processor and a memory, the memory comprising instructions that are configured to cause the processor to perform operations comprising:

sequentially selecting which games appear during continuous execution of a plurality of games, wherein the plurality of games includes different types of games, which include at least a first plurality of first-type games, and a second plurality of second-type games;

continuously executing the plurality of games that have been selected;

during the continuous execution of the plurality of games, determining that a game from the first plurality of first-type games has been selected, wherein the first plurality of first-type games includes processing for an action that, when performed by moving the controller, contributes to accumulation of a physical condition of the controller;

based on determining that the selected game is from the first plurality of first-type games, adaptively adjusting a frequency by which those games included with the first plurality of first-type games are selectable as part of a subsequent selection during the continuous execution of the plurality of games; and counteracting the adjustment of the frequency by which the first plurality of first-type games is selectable based on selection of a game from the second plurality of second-type games, wherein the second plurality of second-type games includes processing for an action that, when performed, counteracts accumulation of the physical condition of the controller.

16. The game apparatus according to claim 15, wherein based on selection of a game of the first-type games, the first-type games are inhibited from selection until a game from the second-type game is selected.

17. The game apparatus according to claim 15, wherein the operations further comprise:

determining the appearing games such that appearance of the first-type games does not exceed a predetermined number of times, in a predetermined mode in which the second-type games do not appear, among game modes in which a plurality of types of games are continuously executed.

18. The game apparatus according to claim 15, wherein the operations further comprise:

displaying at least an action instruction indicating an action to be performed by a player in the game, based on operation data acquired from a controller with an inertial sensor, evaluating a motion of the controller according to the action, and progressing the game on the basis of the evaluation.

19. The game apparatus according to claim 18, wherein the controller includes a strap, and wherein the operations further comprise: in the first-type game, displaying the action instruction that indicates an action of rotating the controller in a state where the controller is not held but is placed.

20. The game apparatus according to claim 19, wherein in the second-type games, the operations further comprise displaying an action of releasing hold on the controller that is held by the player with his/her wrist being put through the strap.

21. The game apparatus according to claim 19, wherein the operations further comprise in the second-type game, displaying the action instruction that indicates an action of putting a wrist through the strap, and rotating the controller that is not held but is placed, and at a predetermined timing during the game, displaying the action instruction that indicates an action of, from a state of holding the controller, releasing the hold on the controller.

22. A game processing method for adaptively sequencing games during continuous execution across a plurality of games that rely on motion of a controller for input, the method comprising:

sequentially selecting which games appear during continuous execution of a plurality of games, wherein the plurality of games includes different types of games, which include at least a first plurality of first-type games, and a second plurality of second-type games;

continuously executing the plurality of games that have been selected;

during the continuous execution of the plurality of games, determining that a game from the first plurality of first-type games has been selected, wherein the first plurality of first-type games includes processing for an action that, when performed by moving the controller, contributes to accumulation of a physical condition of the controller;

based on determining that the selected game is from the first plurality of first-type games, adaptively adjusting a frequency by which those games included with the first plurality of first-type games are selectable as part of a subsequent selection during the continuous execution of the plurality of games; and counteracting the adjustment of the frequency by which the first plurality of first-type games is selectable based on selection of a game from the second plurality of second-type games, wherein the second plurality of second-type games includes processing for an action that, when performed, counteracts accumulation of the physical condition of the controller.

23. The game processing method according to claim 22, wherein based on selection of a game of the first-type games, the first-type games are inhibited from selection until a game from the second-type game is selected.

24. The game processing method according to claim 22, further comprising:

determining the appearing games such that appearance of the first-type games does not exceed a predetermined number of times, in a predetermined mode in which the second-type games do not appear, among game modes in which a plurality of types of games are continuously executed.

25. The game processing method according to claim 22, further comprising displaying at least an action instruction indicating an action to be performed by a player in the game, based on operation data acquired from a controller with an inertial sensor, evaluating a motion of the controller according to the action, and progressing the game on the basis of the evaluation.

26. The game processing method according to claim 25, wherein the controller includes a strap, and the method further comprises displaying the action instruction that indicates an action of rotating the controller in a state where the controller is not held but is placed.

27. The game processing method according to claim 26, further comprising in the second-type games, displaying the action instruction that indicates an action of releasing hold on the controller that is held by the player with his/her wrist being put through the strap.

28. The game processing method according to claim 26, further comprising:

displaying the action instruction that indicates an action of putting a wrist through the strap, and rotating the controller that is not held but is placed, and at a predetermined timing during the game, displaying the action instruction that indicates an action of, from a state of holding the controller, releasing the hold on the controller.

\* \* \* \* \*